US010697986B2

(12) United States Patent
Delamarche et al.

(10) Patent No.: US 10,697,986 B2
(45) Date of Patent: Jun. 30, 2020

(54) MICROFLUIDIC DEVICE WITH PROGRAMMABLE VERIFICATION FEATURES

(71) Applicant: INTERNATIONAL BUSINESS MACHINES CORPORATION, Armonk, NY (US)

(72) Inventors: Emmanuel Delamarche, Thalwil (CH); Onur Gökçe, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 412 days.

(21) Appl. No.: 15/630,991

(22) Filed: Jun. 23, 2017

(65) Prior Publication Data
US 2018/0372765 A1    Dec. 27, 2018

(51) Int. Cl.
*G01N 35/00*    (2006.01)
*B01L 3/00*    (2006.01)
(Continued)

(52) U.S. Cl.
CPC ...... *G01N 35/00732* (2013.01); *B01L 3/5027* (2013.01); *B01L 3/502715* (2013.01);
(Continued)

(58) Field of Classification Search
CPC ... G01N 35/00732; G01N 2035/00772; G01N 2035/00782
See application file for complete search history.

(56) References Cited

U.S. PATENT DOCUMENTS 9,409,173 B2    8/2016    Estes et al.
9,644,623 B2    5/2017    Mathies
(Continued)

FOREIGN PATENT DOCUMENTS

| WO | 2016122552 A1 | 8/2016 |
| WO | 2018235013 A1 | 12/2018 |
| WO | 2018235014 A1 | 12/2018 |

OTHER PUBLICATIONS

Kang et al., "Buckling delamination induced microchannel: Flow regulation in microfluidic devices," Article in Applied Physics Letters, Sep. 2016, Published by AIP Publishing, Appl. Phys. Lett. 102, 031902 (2013); 10.1063/1.4788734, pp. 1-6.
(Continued)

*Primary Examiner* — Jonathan M Hurst
(74) *Attorney, Agent, or Firm* — Jordan T. Schiller

(57) ABSTRACT

A method for optically reading information encoded in a microfluidic device, the microfluidic device including an input microchannel, microfluidic modules, and sets of nodes. Nodes of a first set connect the input microchannel to one of the microfluidic modules, and nodes of a second set connect the one of the microfluidic modules to another to form an ordered pair of the microfluidic modules, where the nodes of the first and second sets have different liquid pinning strengths. A liquid loaded into the input microchannel causes an ordered passage of the liquid through each of the microfluidic modules in an order determined by the liquid pinning strengths of the nodes. The passage of the liquid produces an optically readable dynamic pattern which evolves in accordance with the ordered passage of the liquid through the device.

23 Claims, 14 Drawing Sheets

(51) Int. Cl.
*G01N 1/00* (2006.01)
*G06K 19/06* (2006.01)

(52) U.S. Cl.
CPC ......... *B01L 3/502746* (2013.01); *B01L 3/545* (2013.01); *B01L 2200/028* (2013.01); *B01L 2200/0621* (2013.01); *B01L 2300/021* (2013.01); *B01L 2300/025* (2013.01); *B01L 2300/0654* (2013.01); *B01L 2300/0864* (2013.01); *B01L 2300/0874* (2013.01); *B01L 2400/086* (2013.01); *G01N 2001/007* (2013.01); *G01N 2035/00772* (2013.01); *G01N 2035/00782* (2013.01); *G06K 19/06009* (2013.01)

(56) References Cited

U.S. PATENT DOCUMENTS

| | | |
|---|---|---|
| 2002/0125139 A1 | 9/2002 | Chow |
| 2005/0249641 A1 | 11/2005 | Blankenstein |
| 2011/0098597 A1 | 4/2011 | Wu |
| 2011/0111522 A1* | 5/2011 | Zimmerie ............ A61B 10/007 436/501 |
| 2012/0241013 A1 | 9/2012 | Linder et al. |
| 2013/0043170 A1 | 2/2013 | Rose |
| 2013/0112559 A1 | 5/2013 | Renaudot |
| 2013/0121893 A1 | 5/2013 | Delamarche |
| 2013/0337578 A1 | 12/2013 | Delamarche |
| 2014/0099722 A1 | 4/2014 | Boudot et al. |
| 2014/0230909 A1 | 8/2014 | Di Carlo et al. |
| 2015/0132742 A1 | 5/2015 | Thuo et al. |
| 2016/0101419 A1 | 4/2016 | Li |
| 2016/0279632 A1 | 9/2016 | Delamarche et al. |
| 2016/0361715 A1 | 12/2016 | Shi |
| 2017/0029871 A1 | 2/2017 | Ying |
| 2017/0120240 A1 | 5/2017 | Delamarche |
| 2017/0350821 A1 | 12/2017 | Delamarche |
| 2018/0275153 A1* | 9/2018 | Gwon ...................... G04G 5/00 |
| 2018/0369809 A1 | 12/2018 | Delamarche |
| 2018/0369813 A1 | 12/2018 | Delamarche |

OTHER PUBLICATIONS

Ahn et al., "Disposable Smart Lab on a Chip for Point-of-Care Clinical Diagnostics," Proceedings of the IEEE, vol. 92, No. 1, Jan. 2004, Copyright 2004 IEEE, pp. 154-173.

Liu et al., "Self-Contained, Fully Integrated Biochip for Sample Preparation, Polymerase Chain Reaction Amplification, and DNA Mircoarray Detection," Anal. Chem. 2004, 76, pp. 1824-1831, © 2004 American Chemical Society Published on Web Feb. 25, 2004.

Satoh et al., "Electrowetting-based valve for the control of the capillary flow," Journal of Applied Physics 103, 034903, 2008 (Best Date Available), © 2008 American Institute of Physics. fDOI: 10.1063/1.2832629g, pp. 034903-1-034903-9.

Zoval et al., "Centrifuge-Based Fluidic Platforms," Roceedings of the IEEE, vol. 92, No. 1, Jan. 2004, © 2004 IEEE, pp. 140-153.

Carrilho et al., "Understanding Wax Printing: A Simple Micropatteming Process for Paper-Based Microfluidics," Analytical Chemistry, Aug. 15, 2009, p. 7091-7095, vol. 81, No. 16, American Chemical Society.

IBM, List of IBM Patents or Patent Applications Treated as Related, Appendix P, dated Jun. 26, 2017 , 2 pages.

Pending U.S. Appl. No. 15/630,980, filed Jun. 23, 2017 entitled: "Customizable Microfluidic Device with Progammable Microfluidic Nodes".

Pending U.S. Appl. No. 15/630,982, filed Jun. 23, 2017 entitled: "Microfluidic Device with Multi-Level, Programmable Microfluidic Node".

* cited by examiner

MICROFLUIDIC DEVICE WITH PROGRAMMABLE VERIFICATION FEATURES

BACKGROUND

The invention relates in general to the field of microfluidic devices. It further concerns verification and/or security features for such devices, as well as methods for optically reading, decoding and encoding such features in microfluidic devices. In embodiments, such methods are applied to test devices for diagnostic testing, such as rapid testing devices (e.g., point-of-care test devices and over-the-counter tests).

Microfluidics deals with the precise control and manipulation of small volumes of fluids that are typically constrained to micro scale channels and to volumes typically in the sub-millimeter range. Prominent features of microfluidics originate from the peculiar behavior that liquids exhibit at the micro scale. Flow of liquids in microfluidics is typically laminar. Volumes well below one nanoliter can be reached by fabricating structures with lateral dimensions in the micrometer range. Microfluidic devices generally refer to microfabricated devices, which are used for pumping, sampling, mixing, analyzing and dosing liquids.

Many microfluidic devices have user chip interfaces and closed flow paths. Closed flow paths facilitate the integration of functional elements (e.g., heaters, mixers, pumps, UV detectors, valves, etc.) into one device while minimizing problems related to, e.g., leaks and evaporation. The analysis of liquid samples often requires a series of steps (e.g., filtration, dissolution of reagents, heating, washing, reading of signal, etc.).

Rapid diagnostic test (RDT) devices are devices used for quick and easy medical diagnostic tests. They typically allow results to be obtained within a few hours or less. They notably include point-of-care (POC) test devices and over-the-counter (OTC) tests.

Point-of-care (POC) test devices are devices used for point-of-care testing, also called bedside testing. Such devices allow medical diagnostic testing at or near the point of care, e.g., at the time and place of the patient care. Over-the-counter (OTC) tests are similar devices. They are, however, typically simpler than POC devices and can often be purchased in pharmacies for people to perform the test themselves, e.g., at home or away from healthcare settings and without assistance from healthcare staff.

Such test devices are typically portable, e.g., handheld devices, are easy to use, are of low cost to manufacture, and fast. They are therefore considered an essential technology by the World Health Organization (WHO) for combatting infectious diseases, amongst other types of diseases, and for improving health in countries where such diseases are endemic. OTC devices are frequently used, e.g., for monitoring therapy (e.g., to ensure appropriate doses of blood anticoagulant drugs), for monitoring glucose in blood, or for detecting drugs of abuse in body fluids.

The most widely used diagnostic devices are perhaps the so-called "lateral flow assays", which rely on a stripe of cellulose along which a sample flows and reacts with reagents present on the stripe. Such devices are also called strip tests and are typically provided in the form of sticks to be dipped into a liquid to perform the test. If analytes are present in the sample, a visual cue such as a colored signal appears on the stripe. Similar test devices are used to detect malaria, hepatitis virus, HIV, biomarkers related to heart failure, etc.

Besides diseases, test devices as contemplated herein are commonly used to detect a specific condition, such as pregnancy or ovulation.

There has been numerous reports and alerts regarding such tests being counterfeited or inappropriately sold. For instance, several sources have reported that counterfeited tests had been sold for diagnosing Leishmaniasis. In addition, fake pregnancy tests, fake tests for glucose monitoring and fake human immunodeficiency virus (HIV) test kits (originally designed to test for pregnancy or other conditions) have reportedly been sold, amongst other frauds.

The WHO believes that the counterfeiting of tests compromises the surveillance, detection, and eradication of some diseases. This is particularly worrying with respect to large-scale infectious diseases, as the prevention, treatment, detection, and eradication of some diseases typically needs concerted and global surveillance. Typically, programs for the surveillance, detection, and eradication of some diseases involve heterogeneous types of patients and healthcare settings (e.g., itinerant outpost vs. hospital). A task force called IMPACT (http://apps.who.int/impact/en/) has therefore been setup to provide recommendation and raise awareness regarding the problem of counterfeiting of medical products. This task force focuses on counterfeited drugs and gives useful recommendations on common approaches for adding security features to medical product packages.

Unfortunately, such security features are frequently breached in practice.

SUMMARY

According to an aspect, the present invention is embodied as a method for optically reading information encoded in a microfluidic device. The microfluidic device includes an input microchannel, microfluidic modules, and sets of nodes. Each node of a first set connects the input microchannel to one of the microfluidic modules. Each node of a second set connects the one of the microfluidic modules to another to form an ordered pair of the microfluidic modules. The nodes of the first and second sets have different liquid pinning strengths. The method includes providing the microfluidic device, loading liquid into the input microchannel to cause an ordered passage of the liquid through each of the microfluidic modules, in an order determined by the liquid pinning strengths of each of the nodes, such that the passage produces an optically readable dynamic pattern which evolves in accordance with the development of the passage through the device. The method further includes optically reading the produced dynamic pattern.

According to another aspect, the present invention is embodied as a method for encoding information in a microfluidic device. The microfluidic device includes an input microchannel, microfluidic modules, and sets of nodes. Each node of a first set connects the input microchannel to one of the microfluidic modules. Each node of a second set connects the one of the microfluidic modules to another to form an ordered pair of the microfluidic modules. The nodes of the first and second sets can be altered to have different liquid pinning strengths based on provided encoding information data. The method includes providing encoding information data and the microfluidic device, and encoding the information by altering a subset of the nodes based on the provided encoding information data such that nodes of the first and second sets have different liquid pinning strengths.

Methods embodying the present invention will now be described, together with microfluidic devices they rely on, by way of non-limiting examples, and with reference to the accompanying drawings.

BRIEF DESCRIPTION OF THE DRAWINGS

FIG. 12 illustrates how a pattern of non-soluble spots can be hidden in a general pattern, thanks to additional, soluble spots. The soluble spots get dissolved and flushed by liquid wetting the flow path of a module in which the pattern is arranged, as in embodiments. FIG. 13 shows a sequence of screenshots captured for a single module while operating an actual device, as in embodiments.

FIG. 14 illustrates residual patterns of non-soluble spots that appear in distinct modules;

Figure 1:
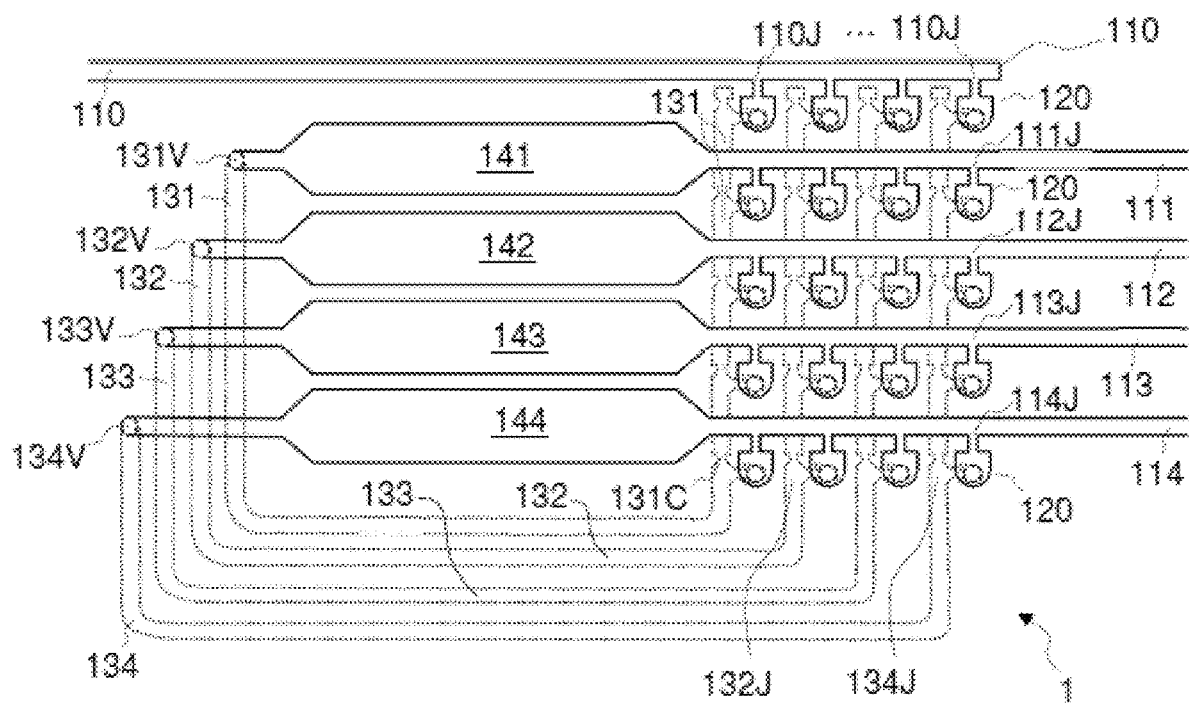
FIG. 1 is a top view of a microfluidic device with a transverse channel configuration and a programmable array of nodes in a crossbar switch configuration, the device 3D fabricated in silicon, as used in embodiments.

The accompanying drawings show simplified representations of devices or parts thereof, as involved in embodiments. Technical features depicted in the drawings are not necessarily to scale. Similar or functionally similar elements in the figures have been allocated the same numeral references, unless otherwise indicated.

DETAILED DESCRIPTION

Detailed embodiments of the present invention are disclosed herein for purposes of describing and illustrating claimed structures and methods that may be embodied in various forms, and are not intended to be exhaustive in any way, or limited to the disclosed embodiments. Many modifications and variations will be apparent to those of ordinary skill in the art without departing from the scope and spirit of the disclosed embodiments. The terminology used herein was chosen to best explain the principles of the one or more embodiments, the practical application or technical improvement over technologies found in the marketplace, or to enable others of ordinary skill in the art to understand the embodiments disclosed herein. As described, details of well-known features and techniques may be omitted to avoid unnecessarily obscuring the embodiments of the present invention.

References in the specification to "one embodiment", "an embodiment", "an example embodiment", or the like, indicate that the embodiment described may include one or more particular features, structures, or characteristics, but it shall be understood that such particular features, structures, or characteristics may or may not be common to each and every disclosed embodiment of the present invention herein. Moreover, such phrases do not necessarily refer to any one particular embodiment per se. As such, when one or more particular features, structures, or characteristics is described in connection with an embodiment, it is submitted that it is within the knowledge of those skilled in the art to affect such one or more features, structures, or characteristics in connection with other embodiments, where applicable, whether or not explicitly described.

In describing various embodiments of the invention, reference may be made to "each" element in a set (e.g., "Each additional set of m nodes branches from a given one of the output microchannels . . . ."); it should be noted that use of the word "each" is for illustrative purposes only, and that embodiments of the invention may be practiced using fewer than each element discussed, as recited in the claims.

In the interest of not obscuring disclosure of embodiments of the present invention, the following detailed description may contain certain processing steps or operations that are known in the art which may have been combined for purposes of clear description and illustration. In some instances certain processing steps or operations that are known in the art may not be described in detail, and/or may not be described at all. It shall be understood that the following disclosure of embodiments of the present invention is relatively focused on distinctive elements, features, structures, or characteristics thereof.

The following detailed description is structured as follows. First, Section 1 describes general principles of the invention. Section 2 describes devices that can be used to implement methods according to embodiments. Specific embodiments are described in Section 3.

In the following description, a shorthand notation is used, on occasion, for numeral references. For example, the notation "k20", where k=1, . . . , 6, may be used in place of numeral references 120, . . . , 620. Thus, the notation "k20" notably encompasses numeral references 120, 420, and 620, which pertain to microfluidic nodes of different microfluidic devices 1, 4 and 6, as respectively depicted in FIGS. 1, 7 and 10.

1. General Principles

An aspect of the invention is first described, which concerns a method for optically reading information encoded in a microfluidic device k.

Microfluidic devices k (k=1, . . . , 6) as used in the present methods include microchannels and other microfluidic features having at least one characteristic dimension (e.g., width or depth) that is in the micrometer range, i.e., typically between 1 µm and 100 µm. Yet, some particular structures of such devices may be in the nanoscale range or in the millimeter range. Generally, the devices as a whole may typically be, for example, in the centimeter range.

Such devices k include an input microchannel k10 and at least two microfluidic modules k4*l*. The devices further include microfluidic nodes k20, which can be partitioned into two sets, i.e., a first set and a second set. Each set includes at least two nodes.

Each node of the first set connects the input microchannel k10 to a respective one of the at least two microfluidic modules k4*l*. Each of such nodes branch from the input microchannel k10, and further branch to a respective one of the modules, e.g., via a distribution microchannel k3*l*. Thus, nodes of the first set may potentially ensure fluidic communication from the input microchannel to the module it branches to.

Each node of the second set connects a respective ordered pair of two of said at least two microfluidic modules k4*l*, so as to potentially allow liquid to pass through given ordered pairs of modules.

Now, nodes k20 have different liquid pinning strengths in each of the first set and the second set of nodes. Accordingly, the extent to which a liquid introduced in the input microchannel passes through ordered pairs of microfluidic modules varies according to the different liquid pinning strengths of the nodes of the first set and the second set. In other words, the different pinning strengths of the nodes determine the order in which liquid reaches the modules, i.e., the order in which the modules are activated.

The different pinning strengths of the nodes results from the fact that the nodes can be altered, as described below in detail. Thus, the effective connections allowed by the device depend on the alteration states of the nodes. That the liquid pinning strengths of the nodes be alterable means that the device is configurable. In other words, the fact that nodes can be altered allows the microfluidic circuit to be configured based on the alteration states of the nodes. That is, the microfluidic circuit can be programmed by suitably programming the nodes. As a result, the microfluidic modules k4*l* may effectively be connected such that liquid initially introduced in the input microchannel may be passed through a programmed sequence of the modules.

Assuming a total number of modules, m, is greater than 2, i.e., m>2, not all of the total number of modules of the device will necessarily need to be reached by liquid in practice. That is, the modules may be wetted by liquid after a certain period, or even not at all, depending on an actual pinning strengths of each of the nodes. However, for the present purposes, at least two of the modules will effectively be reached by liquid, in a given order (as per the programming of the nodes), so as to enable a dynamic pattern of liquid filling these modules.

Accordingly, in operation, liquid is loaded in the input microchannel k10. The loaded liquid will then reach one or each of the at least two modules of the device k, thanks to nodes of the first set. Liquid will then reach another one or, even, each of the at least two modules, to the extent permitted by the pinning strength of the nodes k20 of the second set. As a result, liquid may pass through each of the at least two microfluidic modules k4*l*. Yet, the order in which liquid reaches the modules is determined by the different liquid pinning strengths of nodes k20 of each of the first and second set.

Thus, information encoded in the microfluidic device can be detected by optically reading a dynamic pattern caused by the liquid as the liquid reaches the effectively connected modules. This pattern dynamically evolves, due to the order in which liquid passes through each of the at least two microfluidic modules k4*l*.

This approach allows dynamic information to be encoded and optically read for subsequent decoding. Thanks to configurable nodes of the device k, the order in which modules are activated can be programmed, which can, in turn, be exploited to encode a dynamic code on the device.

At a minimum, the encoded information is reflected by the order in which the modules are activated, as illustrated in FIGS. 17A-17F. In more sophisticated embodiments, dedicated modules include optically readable media, encoding respective keys, as in FIG. 14. The keys can, for instance, be spotted in chambers of the microfluidic modules k4*l*. In this way, the sequence in which the parts of code appear/disappear can be programmed.

In all cases, the encoded information has a specific time evolution signature. Detecting this specific time evolution signature can be exploited here to check, e.g., a correct operation of the device, to provide additional information as to the experimental context of the experience and/or for security purposes.

Security applications are mostly contemplated in the following. Indeed, as dynamic information can be encoded in the programmed functioning of the device, this makes it harder to imitate or fake. Embodiments of the invention may thus be usefully applied to prevent the use of, or to detect, fake or counterfeited devices, or to signalize fraudulent devices including, e.g., test devices which have already been used or were counterfeited. The time evolution signature brings an additional level of security, compared to static codes or no code at all (as is commonly the case for microfluidic devices and, in particular, for rapid testing devices), as the number of parts of the code change according to time sequences determined by the programmable nodes.

The microfluidic features that are needed to implement this additional level of security do not increase fabrication costs significantly. However, they make it much harder to counterfeit such features or to reverse engineer the code implemented by these features.

The time signature can further be used to simply validate a correct operation of the device. E.g., a correct functioning of the device implies a certain sequence, i.e., a certain order of filling of the modules. This correct order may for instance be encoded on any suitable identifier of the device (or the type of device), e.g., in a static code (such as a barcode) provided therewith, or in the accompanying documentation.

In addition, other information can be encoded, which is not necessarily or not primarily intended for security applications or for checking purposes. For example, information as to the context of the test, timing, temperature, etc., may be detected, which information is next used to interpret an outcome of the test. For instance, spots deposited in the modules may include a temperature-sensitive indicator.

Moreover, the programmable nodes may be exploited to functionalize and customize the device. That is, a generic microfluidic template may be fabricated, which may include a number of modules. Yet, only a subset of these modules may need be activated for the purpose of a particular application. Further, it can be contemplated that a multi-purpose microfluidic device template can be designed and mass-fabricated, to allow for considerable cost-savings.

The present approach relies on detecting dynamic patterns caused by a liquid filling microfluidic modules in a given order, as determined by the pinning strengths of the microfluidic nodes. This can be exploited to decode information encoded on the device. Accordingly, embodiments of the invention concerning decoding methods are discussed in Section 3.3.

Another, related aspect of the invention concerns methods to encode information in a microfluidic device. That is, based on certain encoding information data, a subset of the nodes k20 can be altered, to allow for the nodes to have different liquid pinning strengths in each of the first set and the second set. Such methods are discussed in detail in Section 3.4.

2. Microfluidic Devices

The devices are preferably formed on distinct, parallel levels, which include a first level and a second level. A level is a subdivision of the device, i.e., a section parallel to its main plane. Assuming the microfluidic device is approximately a parallelepiped volume, then a given level can be regarded as a parallelepiped section of that volume. That is, if the device has N levels (N=2, 3, . . . ), then the device can be regarded as fitting in a parallelepiped bounding box of height h, which can be partitioned into N contiguous parallelepiped volume sections of height $h_i$, such that $\Sigma h_i = h$. Components of this device will then essentially extend within one, or within another, of these volume sections, i.e., on one level or on another.

2.1 Node Architecture

A preferred node architecture is the following: given a first microchannel k10, k1l, defined on a first level of the device, and a second microchannel k3l, defined on a second level of the device, a node k20 interconnects the first and second channels, so as to potentially allow fluid communication between the two channels. The present devices include a plurality of channels and a plurality of nodes in practice, as exemplified in FIGS. 1, 4-9.

One or more, preferably all, of the interconnecting nodes of the devices k are configured as a multi-level node k20, which are structured as follows. A multi-level node includes: an inlet port k21, a cavity k23, a via k24, and an outlet port k25. As seen in FIG. 2, 3 or 7C and 7D, the inlet port k21 and the cavity k23 are formed on the first level of the device k, with the cavity k23 open on top. The inlet port k21 branches from a first channel, i.e., the input microchannel k10 or one of the output microchannels k1l. This ports communicates with the cavity k23 through an ingress thereof. The outlet port k25 branches to a second channel on the second level. As depicted in FIGS. 1, 4-8, the second channel is a distribution microchannel k31, leading to a respective module k31.

Next, the via k24 extends from the cavity k23 to the inlet port k21, to allow for the cavity k23 to communicate with the outlet port k25. The via k24 may extend perpendicularly between a mid-plane of the first and second levels, i.e., within an intermediate level positioned between the first and second levels of the device. The outlet port k25 may have a rather complex structure (as in FIGS. 2, 3 and 10) or, in variants, be a mere orifice delimiting a lower portion of the via k24 (as in FIGS. 7A-7D).

In addition, the cavity k23 includes, or is otherwise closed off by, a liquid blocking element k22. This element is generally configured to prevent an aqueous liquid that fills the inlet port k21 from reaching the outlet port k25 of the node.

That the cavity k23 be open on top makes it easy to fabricate; it is, for instance, sufficient to produce the cavity 123 and the input microchannel 110 (FIGS. 1-3) by etching the upper thickness of a silicon (Si) substrate, as in the example of FIG. 1. Plus, this makes the cavity easily accessible from the top, which eases operations needed to alter the blocking element, as in embodiments. One may, for instance, spot a wetting material 129, as in FIG. 3, or remove (or otherwise alter) the liquid blocking element 122 from the top (before covering the device), to reduce the pinning strength of the node. If a mere binary switch is desired, the blocking element may be altered so as to merely activate the cavity 123 and enable liquid circulation therethrough. Eventually, this allows an aqueous liquid to enter the cavity k23 and then reach the outlet port k25 of the node k20.

This way, an alterable (e.g., activable or deactivable), multi-level node is achieved, which may potentially allow a fluidic connection between a first channel on a first level of the device (e.g., grooved on one side of a microfluidic chip) and a second channel on a second level of the device (e.g., grooved on the other side of the chip). In addition, the node can be altered so as to change a pinning strength of the node. Eventually, this makes it possible to configure (and possibly re-configure) a 3D microfluidic circuit based on the alteration state of the blocking element(s) of the cavity k23.

Figure 8:
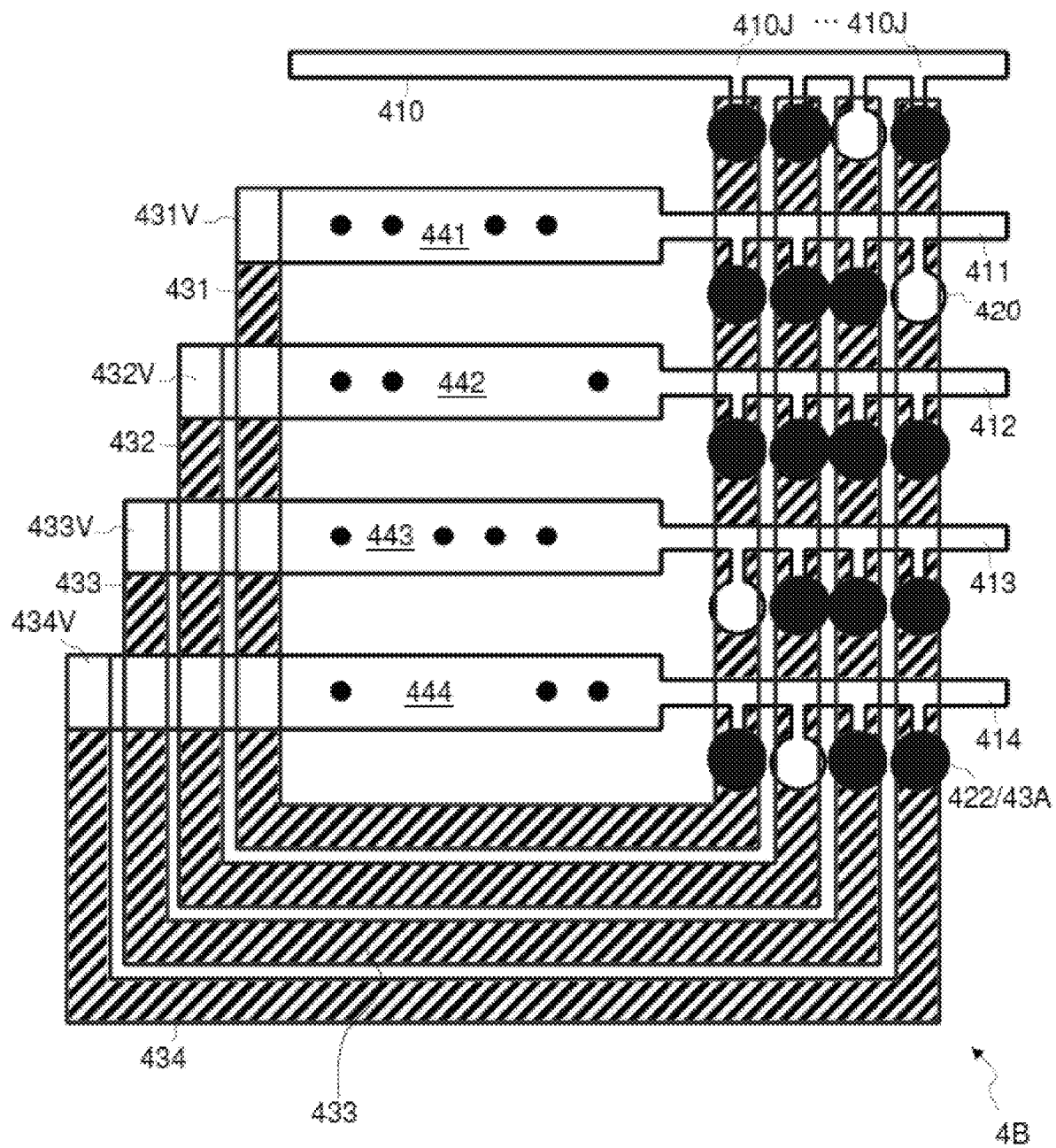
FIG. 8 schematically depicts a top view of a device according to FIG. 7A or 7B.

Such a node structure is suited for use in a multi-level microfluidic circuit that includes multiple channels, as depicted in FIG. 1 or 8. In fact, the node structure is easily duplicable and, thus, allows for a plurality of such nodes that may easily be obtained. The structure of such nodes is particularly suited for implementation in a crossbar switch configuration, together with non-parallel channels on distinct levels of the device. Eventually, such nodes can advantageously be used to reduce the footprint of the devices. The footprint of the devices can indeed be markedly reduced by using non-parallel channels, i.e., channels whose respective projections on a plane separating the first and second levels are transverse. Such channels are hereafter referred to as transverse channels, notwithstanding the fact that they are on distinct levels. To make this possible and prevent short-circuits between the channels, the via k24 extends from the cavity k23 down to the outlet port k25, as seen in FIGS. 2, 3, 7C and 7D. That is, the via extends across an intermediate level of the device, between the first level and the second level. Such devices can thus be regarded as including at least three levels.

Furthermore, a via preferably extends from a bottom side of the cavity k23 (opposite to its top side), down to the outlet port k25, to ease the fabrication. Indeed, it suffices to open the vias from the bottom side of the cavities.

All the more, imposing an intermediate level between outer levels eases the design of devices with transverse channels as the intermediate level prevents short-circuits between the transverse channels at the crossing point. That is, the intermediate level extends between outer levels on which the channels k10, k1*l* and k3*l* are provided. Since the transverse channels are typically open on top of their respective levels (they can for instance be etched, grooved or otherwise formed on the upper thicknesses of a material layer), the intermediate level makes it possible to close the channels defined on a lower level and prevent short-circuits with channels defined on the upper level.

2.2 Device Architectures

Various examples of microfluidic devices are described in the following, which rely on a node structure as described in sect. 2.1 and can flexibly be configured (i.e., programmed so as to activate specific modules in a given order).

Such devices k typically have the following configuration: they include an input microchannel k10, a set of m distribution microchannels k3*l*, a set of m microfluidic modules k4*l* and a first set of m nodes k20, where m≥2. The m microfluidic modules k4*l* are in fluidic communication with the m distribution microchannels k3*l*, respectively.

In this description, terminologies such as "fluidic communication", "in fluid communication with" or "fluidically connected to" refer to one and a same concept, whereby a liquid is allowed to pass from one component to the other, through a passage, a channel, a via or any other suitably designed connection. Now, if a microfluidic node as described above is intercalated on the fluidic path, then one may potentially have a "fluidic communication" (or "fluidic connection"). However, the extent to which fluidic communication is enabled depends on the alteration state of the node and its resulting pinning strength, as described below.

The m nodes k20 of the first set each branch from the input microchannel k10, and further branch to a respective one of the distribution microchannels k3*l*. Thus, a node k20 may potentially ensure fluidic communication from the input microchannel to the distribution microchannel it branches to. Note that the converse does not necessarily hold, as nodes are preferably unidirectional, as described below.

For example, m=4 in FIG. 1, which depicts four microfluidic modules 141-144, each connected by four distribution channels 131-134, respectively. Each of the four microfluidic modules 141-144 further connect to four output channels 111-114, respectively. In FIG. 1, the first set of nodes corresponds to the upper (horizontal) set of m nodes, which each branch from the input channel 110, and further, branch into respective distribution channels 131-134. As further seen in FIG. 1, the device further includes additional (horizontal) sets of nodes, below the first (upper) set. The superset formed by the additional sets of nodes is referred to as a "second set" of nodes.

Figure 2:
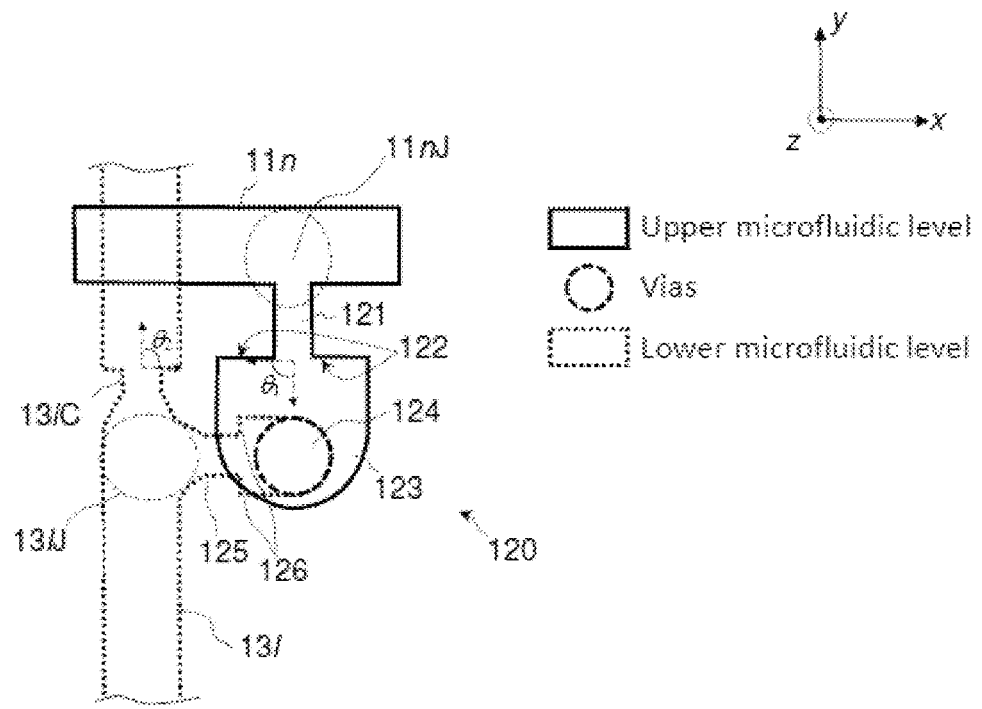
FIGS. 2 and 3 show a top view of a 3D node, which can advantageously be used in the device of FIG. 1, as in embodiments. This node includes liquid pinning structures, which may be foiled thanks to wetting material judiciously placed in the cavity of the node, as illustrated in FIG. 3, so as to activate the node.
Figure 3:
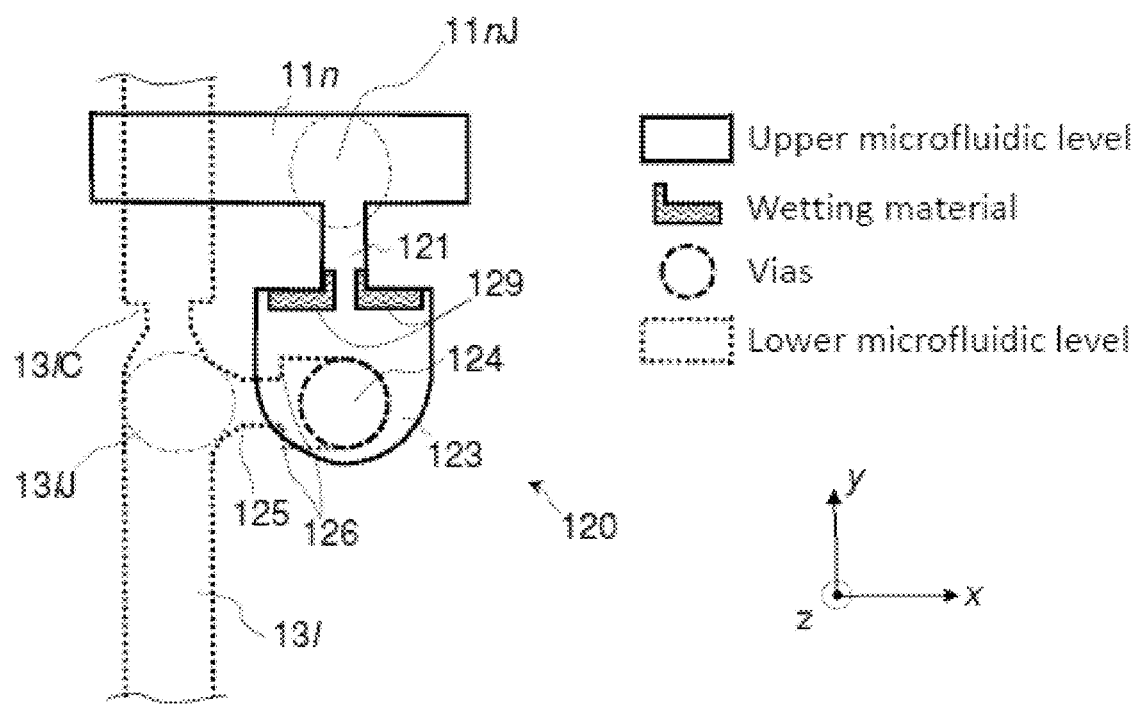

As further illustrated in FIGS. 1-3, the input microchannel k10 may, for instance, include m junctions 110J and each of the m nodes of the first set may accordingly branch from the input microchannel 110 at a respective one of the m junctions 110J. Similarly, nodes of each additional set branch from an output channel 11*l* at a given junction 11*l*J (with l=1, . . . , 4).

Different types of nodes may be contemplated, which may be altered so as to modulate the fluidic connection. Yet, the nodes are preferably all functionally similar, if not identical (as subject to their alteration states).

The microfluidic devices k can be functionalized (and so customized) by altering some of their nodes. After functionalization, a subset, but not all, of the nodes k20 are altered, compared with remaining nodes of their respective sets. Due to this alteration, the nodes k20 in each of the first set or the second set may exhibit different liquid pinning strengths.

As a result of the alteration of nodes of the first set, the extent to which liquid introduced in the input microchannel k10 may reach one or more of the m microfluidic modules k4*l* may also vary, accordingly. Thus, the extent to which such a node effectively allows a liquid to pass from the input microchannel to a downstream module depends on the alteration state of that node. As a result, the downstream microfluidic modules k4*l* may be contacted (i.e., wetted by liquid introduced in the input microchannel), e.g., after a greater or lesser period of time, or may not be contacted at all, depending on the pinning strengths of the nodes of the first set.

Similar considerations apply to nodes of the second set and, in particular, to nodes in each of the m additional sets, which potentially allow liquid to pass from one module to another. This, as one understands, allows a microfluidic device to be programmed.

Incidentally, preferred embodiments of the invention make it possible for nodes to be altered during a final stage of fabrication, or even to be re-configured (to allow for the device to be re-programmable). Thus, at an intermediate stage of fabrication, none of the nodes of the device may be altered yet. Yet, we keep in mind that if none of the nodes are altered or if the nodes are all altered in a similar way, then the nodes typically have all the same liquid pinning strength and no specific functionalization of the device is obtained. Rather, programming the device typically results in only a subset of the nodes being altered in each of the sets of nodes (or at a minimum, the nodes of each set are not all altered in a similar way), in order to differentiate liquid dynamics through the modules and, thus, functionalize and customize the microfluidic device.

In simplest embodiments, the nodes are altered to act in a binary fashion, e.g., as in switches that may pass the liquid, or that may not. In such a case, the microfluidic nodes can be compared to transistor switches or logic gates. That is, the nodes k20 may be configured so as to either pin a liquid thereat, or pass a liquid therethrough. Also, a node may be designed to be "normally ON", and hence need be altered to become OFF, or conversely, a node may be designed to be "normally OFF", and hence need be altered to become ON. In variants, the nodes k20 may be altered so as to enable distinct flow rates of liquid therethrough, to allow for liquid to effectively reach the modules at different times.

In addition, the microfluidic circuits may be hardcoded, i.e., with the nodes altered in a non-reconfigurable way. However, in embodiments, the microfluidic devices may remain at least partially reconfigurable.

In the context of this invention, one may ideally want to rely on a complex microfluidic circuit, e.g., as in one that includes a plurality of functionally distinct modules which allow the device to be programmed so as to enable any fluidic sequence throughout the modules. This, however, may typically result in a very complex architecture and large device footprints. Thus, it is of remarkable advantage to rely on a crossbar switch-like configuration of the nodes. Not only does this allow a reduced footprint of the devices, but, in addition, this eases the programming of the nodes. To achieve this, a best practice may rely on transverse sets of input/output channels and distribution microchannels.

Now, to make this possible, one advantageously relies on a multilevel device, such as depicted in FIGS. 1, 5-7, wherein different, transverse sets of microchannels are provided on distinct levels of the device. Then, in order to interconnect the channels, one may preferably rely on 3D nodes as described above, i.e., as in those having an inlet branching from, and an outlet branching to, the distinct levels of the device.

This way, complex architectures of non-parallel microchannels can be achieved, which are configurable (and possibly re-configurable) and which are based on a same initial microfluidic template. Once customized, only a subset of the microfluidic modules will typically be or remain activated. More generally, the different modules may be activated at different times, where it should be noted that de-activated or non-activated modules can be regarded as modules that are activated at an infinite time period after a liquid was initially introduced in the input microchannel. Otherwise put, the time at which a module is activated (i.e., reached by liquid) depends on the liquid pinning strengths of nodes connected thereto.

In addition, the modules may possibly be linked, thanks to nodes of the second set, so as to enable sequences involving a given order of modules that will be reached by a liquid. That is, a same input flow may reach a given one of the module after another, given one of the modules, etc.

This, as it may be realized, has considerable advantages in terms of manufacture, inasmuch as a multi-purpose microfluidic device template may be designed, which potentially enables multiple applications (e.g., fluid reaction, fluid mixing, optical detection, etc.), for which only a subset of the modules need be activated and, this, according to a given order. This is achieved thanks to suitable node architectures and suitably altered nodes, as discussed herein. Finally, as a same, multi-purpose microfluidic device template can be designed and mass-fabricated, considerable cost-savings can be contemplated.

The second set of nodes preferably includes m subsets of m nodes k20 each, forming m additional sets of m nodes k20, in addition to the first set of m nodes k20, as described above. Altogether, the m additional sets of m nodes k20 potentially allow liquid to pass through given ordered pairs of modules. In each of the examples of FIGS. 1, 4, 8 and 9, the first set of m nodes corresponds to the upper, horizontal set of nodes branching from the input microchannel k10, whereas the second set of nodes corresponds to the m additional sets of m nodes k20 each, which are located below the upper set (with m=4 in FIGS. 1, 4 and 8, and m=8 in FIG. 9).

Next, a device k may include a set of m output microchannels k1$l$ (l=1, ..., m), each connected to an output of a respective one of the m microfluidic modules k4$l$. The m output microchannels are associated with the m additional sets of nodes. That is, each of the m output microchannels k1$l$ branches into each of the m nodes k20 of a respective one of the m additional sets. Furthermore, each node of each additional set branches to a respective one of the distribution microchannels k3$l$. In other words, each node of each additional set connects an output channel k1$l$ to a distribution channel k3$l$.

For example, in FIG. 1, the first node in output of the upper module 141 connects to the first distribution channel 131, which connects to the same module 141. The second node in output of module 141 connects to the second distribution channel 132, and so on. That is, the lth node connects to the lth distribution channel. A similar configuration is assumed in FIGS. 8 and 9 (although the lower channels are hidden in FIG. 9). As seen in these examples, the distribution channels are preferably nested, to reduce the footprint.

Now, the additional nodes are altered too, so as to exhibit different pinning strengths. For instance, a subset (that is, not all) of the m nodes of at least one of the m additional sets may be altered, compared with remaining nodes of this set, to allow for the nodes of this set to have different liquid pinning strengths. As a result, liquid introduced in the input microchannel k10 (at an initial time) passes through at least one ordered pair of the m microfluidic modules k4$l$. The sequence actually enabled is determined by the different liquid pinning strengths of the nodes of: (i) the first set of m nodes; and (ii) said at least one of the m additional sets, in operation. Of course, nodes in other ones of the additional sets may be altered too, to enable more complex sequences.

In embodiments such as those depicted in FIGS. 1, 4, 8, 9, the devices all include m+1 sets of m nodes k20 each, in total, which correspond to the first set of m nodes and the second set formed by the m additional sets of m nodes each. There are thus m×(m+1) programmable nodes in total in such cases. Each of these nodes is preferably configured so as to either pin a liquid or let it pass.

As, for instance, seen in FIG. 1, each output microchannel 11$l$ (l=1, ..., m) includes m junctions 11$l$J. Each additional set of m nodes branches from a given one of the output microchannels 11$l$ at the level of a respective junction. That is, each node of any one of the additional sets branches from a given one of the output microchannels, at a respective one of the m junctions 11$l$J. A similar configuration is adopted in each of the devices of FIGS. 4-8.

Since each node of each of the m additional sets branches to a respective one of the distribution microchannels k3$l$, the nodes may, as a whole, potentially allow fluidic communication between $m^2$ ordered pairs of the microfluidic modules k4$l$, subject to comments below.

The $m^2$ ordered pairs that can potentially be enabled stem from the fact that the input microchannel branches into each of the m nodes of the first set, thus giving m possibilities for the first module (i.e., the first element of the ordered pairs). Now, the output microchannel of any module branches into each of the m nodes of a respective one of the additional sets, yielding m possibilities for the second element of the ordered pairs and, this, for each of the m first elements. There are thus potentially $m^2$ ordered pairs of modules than can be put in fluidic communication (which can be regarded as an arrangement with repetition, as to the number of 2-tuples of an in-set).

Now, the additional nodes may further be configured to allow a number of sequences of modules, wherein a sequence corresponds to an ordered n-tuples of modules. Yet, the number of arrangements of fluidic sequences that are effectively enabled in practice is typically (much) smaller. Indeed, each set of nodes will typically be programmed to allow liquid passing therethrough to reach a reduced subset of the modules (typically, at most one module). In addition, and depending on the precise structures of the node and distribution channels, it may physically be impossible for liquid exhausted by a given module to later re-enter that same module, despite the presence of an interconnecting node, due to the presence of liquid in the corresponding distribution channel.

Assuming, for instance, that liquid exhausted by one module should at most reach a distinct module (which was not used so far, such that liquid never passes twice through a same module), there are m possibilities for the first module to be reached by liquid, m−1 possibilities for the second, etc., such that there are m! possibilities of fluidic sequences in total. Yet, not all of the modules need be exploited in practice, such that much simpler sequences will typically be enabled.

For example, assume that one pair of modules is effectively needed for a given application, e.g., one for reaction purposes, and another one for detection purposes. In that case, a single node need be activated in the first set (i.e., the upper set in FIG. 1), in order to allow liquid to reach the reaction module. Next, a single node need be activated in output of the reaction module, to allow liquid to reach the detection module. Thus, the sequence formed by the liquid passing through that pair of modules can be optically detected and the corresponding time signature decoded, e.g., for validation of security purposes.

Figure 4:
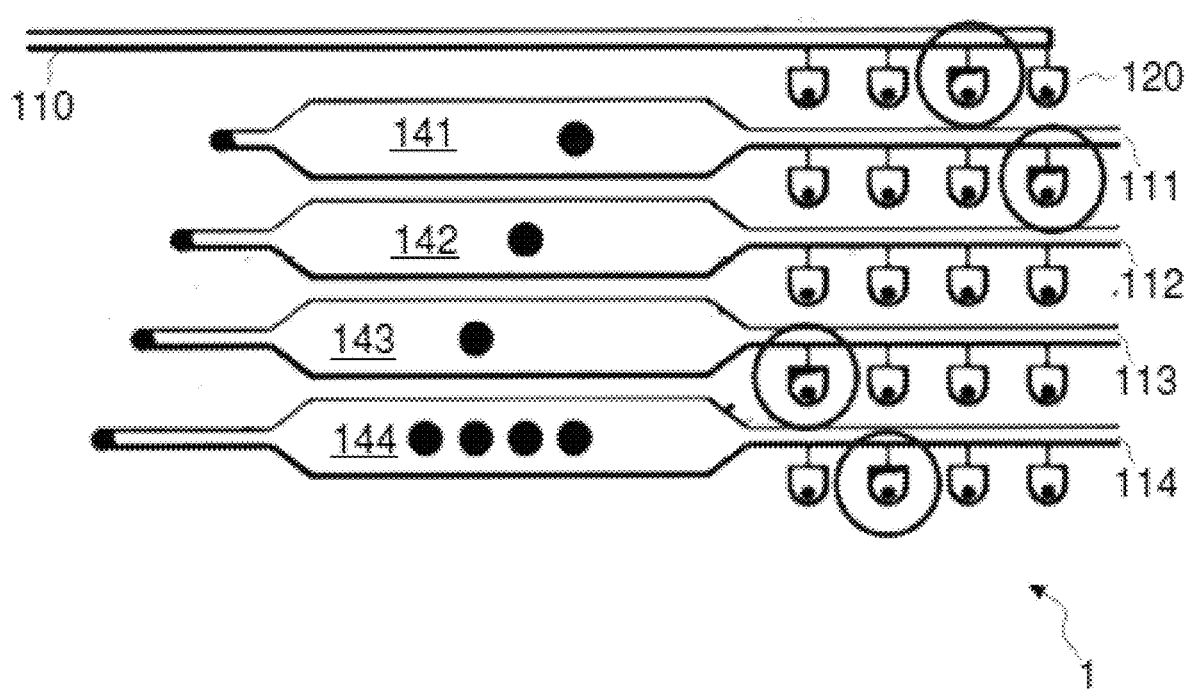
FIG. 4 is a photograph (in gray level, highly contrasted for depiction purposes) of a top view of a prototype device, having a configuration as shown in FIG. 1, whose activated nodes are emphasized.

As another example, FIG. 4 shows a photograph of the top layer of an actual microfluidic device (which has the same configuration as the device of FIG. 1), wherein activated nodes are emphasized. The sequence enabled is as follows:

The $3^{rd}$ node of the upper set of nodes is activated, which enables fluidic connection to the third distribution channel (not visible in FIG. 4, corresponding to channel 133 in FIG. 1) and thus brings liquid to the third module 143, in operation. Liquid exhausted from this module 143 reaches the output channel 113 and, in turn, the $3^{rd}$ additional set of nodes that branch therefrom;

In the $3^{rd}$ additional set of nodes (i.e., the $4^{th}$ set starting counting from the top): only the $1^{st}$ node is activated, which brings liquid to the first module 141, then to output channel 111 and the $1^{st}$ additional set of nodes; and In the $1^{st}$ additional set (underneath the upper set): only the $4^{th}$ node is activated, which brings liquid to the $4^{th}$ module 144;

In the $4^{th}$ additional set: only the $2^{nd}$ node is activated, for liquid to reach the $2^{nd}$ module 142; and None of the nodes is logically activated in the $2^{nd}$ additional set, in output of the second module 142, as this module is the last to be reached by liquid.

Accordingly, liquid initially introduced in the input channel 110 successively passes through the third module, the first module, the fourth module and finally the second module. A particular sequence of four distinct modules is effectively enabled in that case and all the modules are effectively exploited here. In variants, only a subset of the modules could have been exploited and, possibly, in a different order. In all cases, the sequence formed by the liquid passing through the modules can be optically detected and the corresponding time signature decoded.

Note that, in the example of FIG. 4, most nodes are not activated and a distribution channel is at most activated once (the $l^{th}$ node in any set is at most activated once), to avoid short-circuits. Now, we note that the design of the device and its operation may make it physically impossible for liquid to re-enter a same module, even if the interconnecting node is activated. For example, the design assumed in FIGS. 1-3 prevents this. Assume that module 141 is enabled, as per activation of the first node in the upper set (call it the first activated node). Now, even if the first node in output of module 141 is activated (called second activated node), so as to tentatively allow liquid to re-enter module 141 via the first distribution channel 131, liquid that already fills channel 131 as per the first activated node prevents additional liquid insertion from the second activated node, especially as constriction valves are provided in channel 131 in this example. Thus device may be configured such as to prevent liquid short-circuits. Yet, if liquid has already left the channel 131 at the moment a liquid front re-enters channel 131, then it may be possible for liquid to re-enter a same module. This, however, requires precise control on liquid segments.

Whether liquid short-circuits are permitted or not depends on the exact structures of the nodes and the distribution channels, e.g., on the possible presence of vents, valves, etc. Of note is that liquid short-circuits may advantageously be exploited to cause to block liquid in a given module. This can be useful in some cases, e.g., for detection purposes. Incidentally, creating short-circuits is typically not an issue in devices implemented on wicking media, since the porosity of the latter allow for venting intrinsically.

Thus, in general, the devices k may allow a module to branch into any of the modules (i.e., another module or, even, that same module), even though short-circuits may be avoided, by suitably programming the nodes, or prevented, due to the residual liquid in the distribution channels and the configuration of the device.

Now, in typical scenarios, short-circuits are not needed. Rather, the device is typically configured for a given module to effectively branch into a distinct module that is not meant to be activated before said given module, as in the scenario of FIG. 4. In other words, the device is typically configured (i.e., programmed) so as to allow a sequence of modules to be successively reached by liquid. This reflects in that each distribution channel is at most activated once, which precludes potential issues in terms of liquid short-circuits.

To summarize, devices such as depicted in FIGS. 1-9 allow a liquid introduced in the input microchannel k10 at an initial time to pass through one or more ordered pairs of modules. Thus, liquid may pass through a sequence of distinct modules k4$l$, wherein a sequence chains up ordered pairs of microfluidic modules k4$l$. In all cases, the actual liquid paths depend on the alteration states of the m×(m+1) nodes. Again, one understands that such designs literally allow the microfluidic modules to be programmed.

As noted earlier, the nodes k20 are preferably configured so as to either pin a liquid or let it pass, i.e., to effectively act as an OFF-ON switch. Preferably, the microfluidic nodes of the devices are all functionally similar, if not all identical (as assumed in the appended drawings), whether they belong to the first (upper) set or the second set (additional, lower sets) of nodes. This simplifies the design and programming of the devices. Now, variants can be contemplated, in which the nodes are differentiated. That is, some of the nodes may effectively act as a binary switch, whereas other nodes may more subtly be configured to allow different flow rates of liquids passing therethrough, to give rise to complex liquid sequences.

Figure 10:
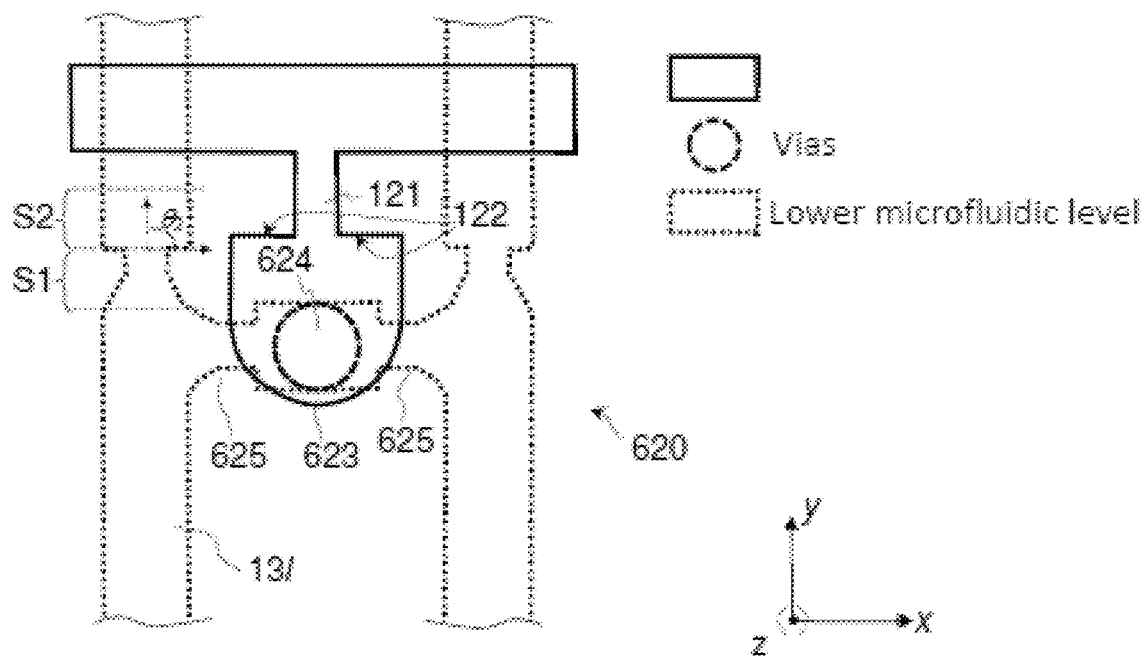
FIG. 10 is a top view of a variant to the node of FIG. 2, wherein the node branches into two distribution channels, as involved in embodiments.

In addition, a node may have two (or more) outlet ports, as in FIG. 10, such that a module may effectively branch into two subsequent modules and, this, via a single interconnecting node. As one understands, many variants can be contemplated. In all cases yet, programmed liquid sequences can be optically detected.

As illustrated in FIGS. 1, 4-9, the present microfluidic devices k preferably involve nodes in a crossbar switch configuration. That is, such devices include m+1 sets of m nodes k20, which are arranged as an array of m×(m+1) nodes, intercalated between an inlet channel and an outlet channel, in a crossbar switch configuration. That is, this array is preferably rectangular, so as to form an array of m+1 recognizable rows of m nodes each, forming m columns, as in the examples of FIGS. 1 and 4-9. Each node of this array branches from a horizontal channel into a vertical channel, just like electronic crossbar switches includes switches at each intersection of a crossed pattern of interconnecting lines. Relying on such an array eases the design of the device and further makes it more easily programmable.

Now, in the examples of FIGS. 1-3, the m additional sets of nodes k20 and the distribution microchannels normally prevent liquid exhausted by a given one of the modules k4$l$ to later re-enter that same module, assuming liquid is continuously fed in the input channel k10, as noted earlier. Yet, this has little consequences in practice as a microfluidic module is typically meant to be used once (in a given experiment, irrespective of the potential reuse of the device). Thus, in a crossbar switch configuration, wherein nodes act as ON-OFF switches (as assumed in FIG. 1 or 4), this means that diagonal nodes have little use in practice and could simply be omitted.

Therefore, embodiments can be contemplated, which involve a crossbar configuration of m×(m+1)−m=m² (i.e., diagonal nodes are skipped).

Similarly, some node connections may be excluded ex-ante, because of particular design options, e.g., because it does not make sense, practically, to potentially connect specific pairs of modules. In that respect, the microfluidic modules will typically have different functions. The set of microfluidic modules may notably include one or more of: an optical detection chamber (configured in the device so as to enable optical detection); a fluid mixing chamber; and a reaction chamber. Yet, the present devices include at least two modules (to enable the detection of a dynamic pattern) and, more likely, they may include 3, 4, 8 or even more modules.

Figure 9:
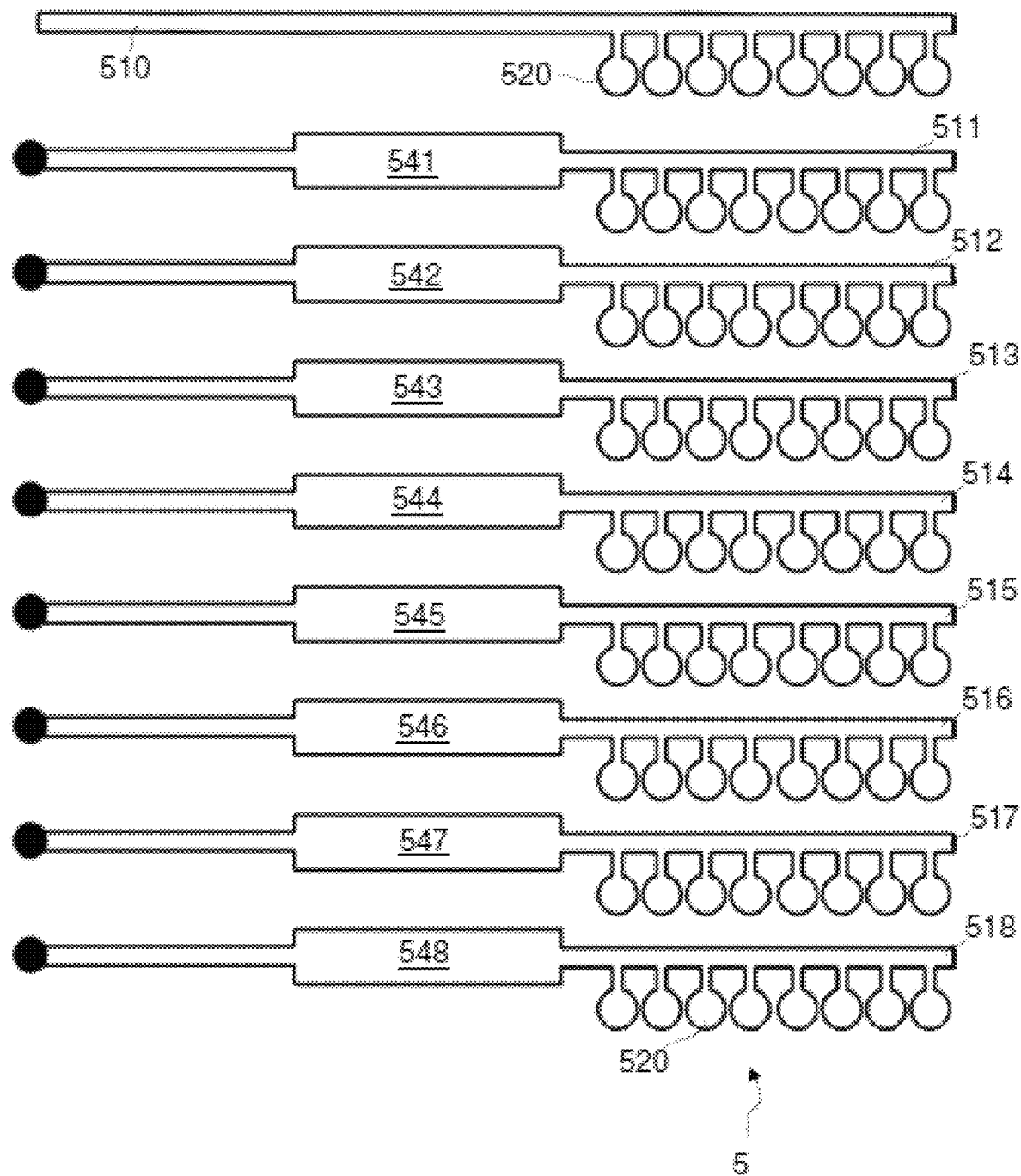
FIG. 9 is a top view of another microfluidic device, including eight microfluidic modules, connected in a crossbar switch configuration, as involved in embodiments.

Consider for instance the microfluidic template of FIG. 9, which includes eight distinct modules. The design of FIG. 9 is an attempt at a "universal" microfluidic platform, which involves (from top to bottom) three orthogonal flow mixers 541-543, two microfluidic reaction chambers 544-545 (as known per se), a mixer 546 (as known per se) and two detection modules 547-548 (as also known per se). Such a chip may be configured during the reagent integration step by selecting which components will be used. This chip template can, for instance, be configured to implement multiplexed assays, multistep reactions, etc.

Generally, the orthogonal flow mixers can include, for example, channels that are oriented so as to create two flow paths or components, as described in further detail below, that occur in different directions. One first flow component brings a liquid in the vicinity of a surface of interest (typically where reagents may be located). The second flow component brings the liquid over that surface. In various embodiments, the two flow components are orthogonal, for simplicity of the designs. Accordingly, at least some of the present concepts (these flow components, the way they dissolve and distribute reagents in a liquid) can be referred to as "orthogonal flow mixing".

For optical detection purposes, one side of the device (on which the modules are) is preferably covered by a light permissive (e.g., transparent) cover or lid. This, however, is not necessarily the case for devices implemented on wicking media, such as paper. Now, the nodes are preferably concealed (not under a transparent window). This way, a user cannot guess which of the modules are activated upon visual inspection. Similarly, the back (distribution) channels may be concealed. A malicious user can thus not predict and fake the correct time signature code.

In variants, the nodes may be visible. However, the way they are altered (in order to have different pinning strengths) cannot be detected upon visual inspection, e.g., because chemicals used to alter the pinning strengths of the nodes k20 are not visible. In addition, the distribution channels too may be concealed. However, since the latter are typically nested or otherwise have a logical arrangement (e.g., to lower the footprint, which may be quite predictable, best is to have concealed nodes k20 or undistinguishable nodes k20.

As further assumed in the example of FIG. 9, some of the modules may have a similar function, such as detection modules 547-548. Thus, some connections may be excluded by design (e.g., it may not be necessary to potentially connect two detection chambers). More generally, it may not be necessary to potentially connect all pairs of modules. In that case, the additional set of nodes may include less than m nodes each. For example, the device may include m additional sets of m−1 nodes each, be it to exclude short-circuits, as noted earlier. More generally, only specific pairs may potentially be connected by nodes.

Generalizing this, one understands that the microfluidic devices should include, at a minimum, at least two microfluidic modules and, consistently, a first set of at least two nodes (each connecting the input microchannel to a respective one of the modules), as well as a second set of at least two nodes, to connect pairs of module that effectively need be connected. As noted earlier, this second set corresponds to the superset formed by m additional sets, which may possibly have a reduced number (<m) of nodes, compared with the m×(m+1) node configurations described above. Nodes in the second set potentially connect ordered pairs of distinct modules. Now, consistently with earlier examples, a subset of the nodes of each of the first set and the second set may be altered, to allow for the nodes to have different liquid pinning strengths, in each of the first and second sets. As a result, liquid introduced in the input microchannel passes through at least one ordered pair of two microfluidic modules. The sequence actually enabled is determined by the different liquid pinning strengths of the nodes of each of the first set and the second set.

However, and as the present Inventors observed, reducing the number of potential connections in the second set does not happen to simplify the design of the devices in practice, contrary to what one would expect. In fact, this even challenges the concept of a universal microfluidic chip. Eventually, it is perhaps simpler to adopt a design with m×(m+1) nodes, in a crossbar switch configuration. In addition, a m×(m+1) crossbar configuration may allow more flexibility, inasmuch as one may want to exploit short-circuits and hence stop liquid flow in one or more modules, e.g., for detection purposes, as noted earlier.

As illustrated in FIGS. 1-3, 7, components of the present microfluidic devices k are arranged according to distinct, parallel levels. As for instance suggested by the patterns of dashed and dotted lines of FIGS. 1-3, the input microchannel 110 and the output microchannels 11l are defined on a first (top) level of the device, whereas the distribution microchannels 13l are defined on a second (bottom) level. Each level may be embodied by a respective layer, or by several layers, as discussed later in reference to FIGS. 5-7. In addition, an intermediate level (or layer) is involved, between the first and second levels (layers), on which level the vias of the nodes extend, as described earlier. Such arrangements allow transverse, 3D channel configurations, where, e.g., both the input channel and the output channels are arranged parallel to a first direction, on a first level, whereas the distribution channels are arranged parallel to a second direction (transverse to the first direction), on a second level. Such transverse channel configurations allow more compacts arrangements of the channels to be designed and, in turn, devices of reduced footprints to be achieved. Transverse channel configurations are particularly desired in embodiments relying on crossbar switch configurations of the nodes.

Therefore, 3D nodes as described earlier are advantageously used in devices as depicted in FIGS. 1, 4-9, so as to enable transverse, 3D channel configurations. For example, referring to FIGS. 2, 3, 7C and 7D, some or (preferably) all of the nodes k20 of the m+1 sets of m nodes include, each: an inlet port, a cavity with a liquid blocking element, a via, and an outlet port, as described earlier.

For simplicity, one node typically has one input port and one output port only, as in the examples of FIGS. 1-9. However, more sophisticated variants may be contemplated, where one node has, for example, two output ports, as illustrated in FIG. 10. In that case, a single node activation allows two modules to be concurrently activated.

In the examples of FIGS. 1-3 and 10, the liquid blocking element is a pinning structure 122 formed at the ingress of the cavity 123. The pinning structure 122 is configured to stop (or at least resist the progression of) a liquid filling front of an aqueous liquid at the ingress of the cavity 123. This makes it particularly simple to activate the cavity. Indeed, as the pinning feature 122 is arranged right at the ingress of the cavity, the room left vacant in the cavity can conveniently be exploited to spot a wetting material 129, or to otherwise alter the pinning structure 122, in order to alter the pinning strength of the node. The pinning structures is typically altered from the top. Still, the device may be sealed, at a later stage, e.g., by covering all open structures on top with a lid, as is usual in the art.

As illustrated in FIG. 2, 3 or 10, the liquid pinning structure 122 is preferably formed by an opening angle $\theta_1$ of the cavity 123, which angle is preferably between 90° and 160°. Yet, this angle may be between 60° and 90°, provided hydrophobic walls are used. This opening angle is measured between an average flow direction of liquid at the input port (i.e., along −y) and one or more walls of the cavity 123 around its ingress, wherein such walls extend in a plane parallel to (x, z), as seen in FIG. 2. For example, this angle may be of 90°, i.e., formed by a straight wall (extending perpendicularly to the liquid inlet direction −y), to which the inlet port leads.

In more sophisticated designs, this angle is strictly larger than 90° (e.g., it is between 110° and 160°). Considering a situation where liquid fills the inlet port with an advancing contact angle, the enlargement, i.e., the widening at the entrance in the cavity, adds an angle component that resists the propagation of the meniscus into the cavity, e.g., as in instances of the Venturi effect. A particularly satisfactory value for this angle is 135°.

In the examples of FIGS. 2, 3 and 10, the ingress of the cavity 123 further has a width (as measured along axis x) that is smaller than its depth (measured along z). Walls of the cavity, on each side of the ingress, are separated by a gap corresponding to the width of the ingress. Said walls accordingly form two opposite opening angles $\theta_1$ in the cavity, which angles are, each, between 60° and 160°. The inlet port 121 may, for instance, extend along a main axis of the cavity 123 (parallel to axis y), to allow for the ingress to be centered in the cavity. This way, two lateral edges 122 are formed on each side of the gap, which, in turn, yields the two opening angles $\theta_1$. Since, in addition, the depth of the ingress is larger than its width, liquid that gets laterally pinned at the ingress of the cavity cannot overcome the pinning barrier by capillary action, i.e., as by wetting both a bottom of the inlet port and cavity and an opposite lid, in operation.

Best is to have the ingress centered at the entrance of the cavity 123. Yet, in variants, the ingress may be off-centered laterally (along x), which may lead to partial liquid pinning only. In other variants, other pinning structures may be used (such as pillars or other microfluidic structures) to pin the liquid.

As illustrated in FIG. 3, the node of FIG. 2 may easily be altered, e.g., thanks to a wetting material 129 spotted at the liquid pinning structures 122. This wetting material allows an aqueous liquid filling the inlet port 121 to reach the outlet port 125, notwithstanding the liquid pinning structure 122, in operation. The wetting material 129 may for instance include wetting chemicals, spotted at the locations of the pinning structures 122, or wetting micro-particles, a liquid, a dye, salt, or a surfactant. More generally, this could be any material whose residual material (once dried) is wettable by an aqueous liquid such as water or another aqueous solution.

In variants, the liquid pinning structures 122 may be physically altered (instead of chemically), in order to allow the liquid to reach the outlet port 125. For example, the opposite ingress edges 122 of the cavity may be physically altered to smooth the opening angles, such that a liquid filling front may pass the ingress and wet the cavity 123. This, however, typically makes it more difficult to configure the nodes.

In the example of FIGS. 2 and 10, the cavity is disabled, by default (i.e., normally OFF). Only those nodes that need be activated (to enable the desired ordered pairs of modules) will be altered in that case, which is simply achieved thanks to cavities that are open on top (before sealing).

As depicted in FIG. 1-3, the inlet ports 121 of nodes of a same (e.g., horizontal) set 120 of nodes may have different hydraulic resistances. The width of the inlet port 121 and so the ingress of the cavity impacts the pinning strength of the node. Having inlet ports of different hydraulic resistances may thus be exploited to compensate for the differences in flow rates of liquid reaching the shifted inlet ports of nodes of a same set, whether branching from the input channel 110 or any of the output channels 11*l*. For example, the width and/or the length of the inlet ports 121 may be varied, as the hydraulic resistance notably depends on the geometry of the conduits, e.g., as in instances of the Venturi effect.

As further illustrated in FIGS. 2, 3 and 10, the outlet ports 125 of the nodes 120 may optionally include a fluid flow constriction valve 126, so as to prevent an aqueous liquid in the distribution microchannel 13*l* branched by the outlet port 125 to reach the via 124. This valve 126 is provided to prevent liquid in the distribution channel to enter this node. That is, the pinning strength of the valve 126 of the outlet port 125 depends on the flow direction. For an incoming flow, it has a higher pinning strength than the portion of the microchannel 13*l* at the level of the junction 13*l*J, at which the outlet port 126 branches. The valve 126 may for instance form two opposite opening angles for a liquid flow coming from the branched distribution channel 13*l*, just like the liquid pinning structures 122 at the ingress of the cavity.

As seen in FIG. 2 or 3, the output port 125 branches to a distribution channel 13*l*, at the level of a junction 13*l*J, which preferably includes a fluid flow constriction valve 13*l*C, on one side of this junction 13*l*J. This additional valve forces an aqueous liquid exhausted through the outlet port 125 toward direction −y. However, and as seen in FIG. 2, an aqueous liquid coming from the other side of the junction may pass the valve 13*l*C. Thus, the outlet port 125 and the valve 13*l*C of the second microchannel 13*l* function as a diode. This makes it possible for a column of nodes to branch to a same distribution microchannel. Meanwhile, the valve 126 prevents liquid already present in that column (that possibly comes from higher, activated nodes) to enter the node (the node is thus unidirectional).

The fluid flow constriction valve 13lC is preferably formed by differently shaped sections S1, S2 of the channel 13l, as depicted in FIG. 10. The first section S1 is tapered and leads to the second section S2, which has a larger average diameter than the first section, so as to provide an opening angle $\theta_2$ in the second section, which again may be between 60° and 160°. The opening angle $\theta_2$ is measured between a main longitudinal axis of the outlet channel 13l (parallel to y) about the constriction valve and one or more walls of the second section S2, to which the tapered section S1 leads. Thus, a liquid flow coming from the first section S1 is pinned at the ingress of the second section S2, whereas liquid flow coming from the opposite direction can pass the constriction 13lC.

Figure 5:
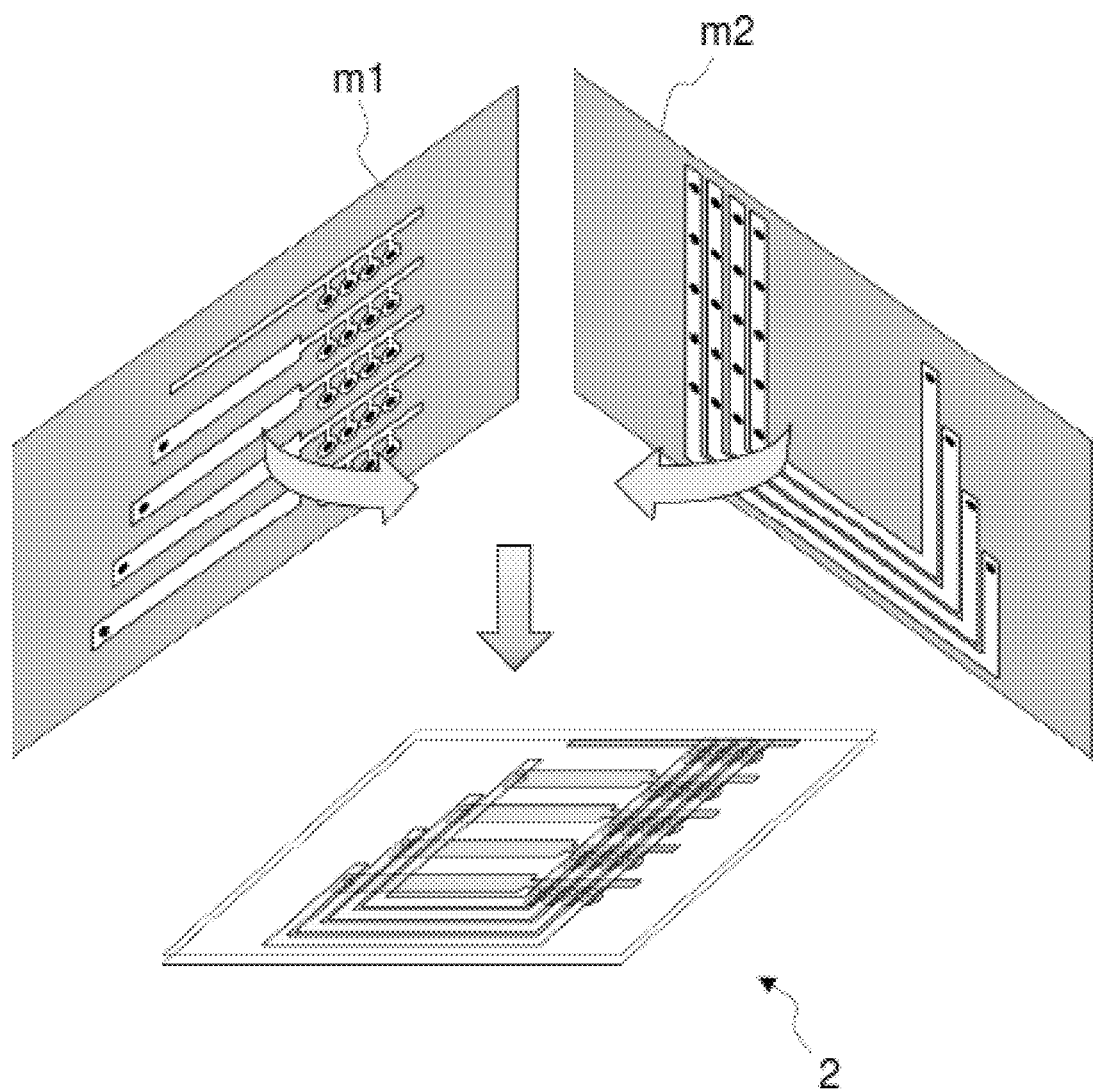
FIGS. 5-6 are 3D views illustrating possible fabrication methods of microfluidic devices as involved in embodiments, which fabrication methods rely on injection molding techniques.
Figure 6:
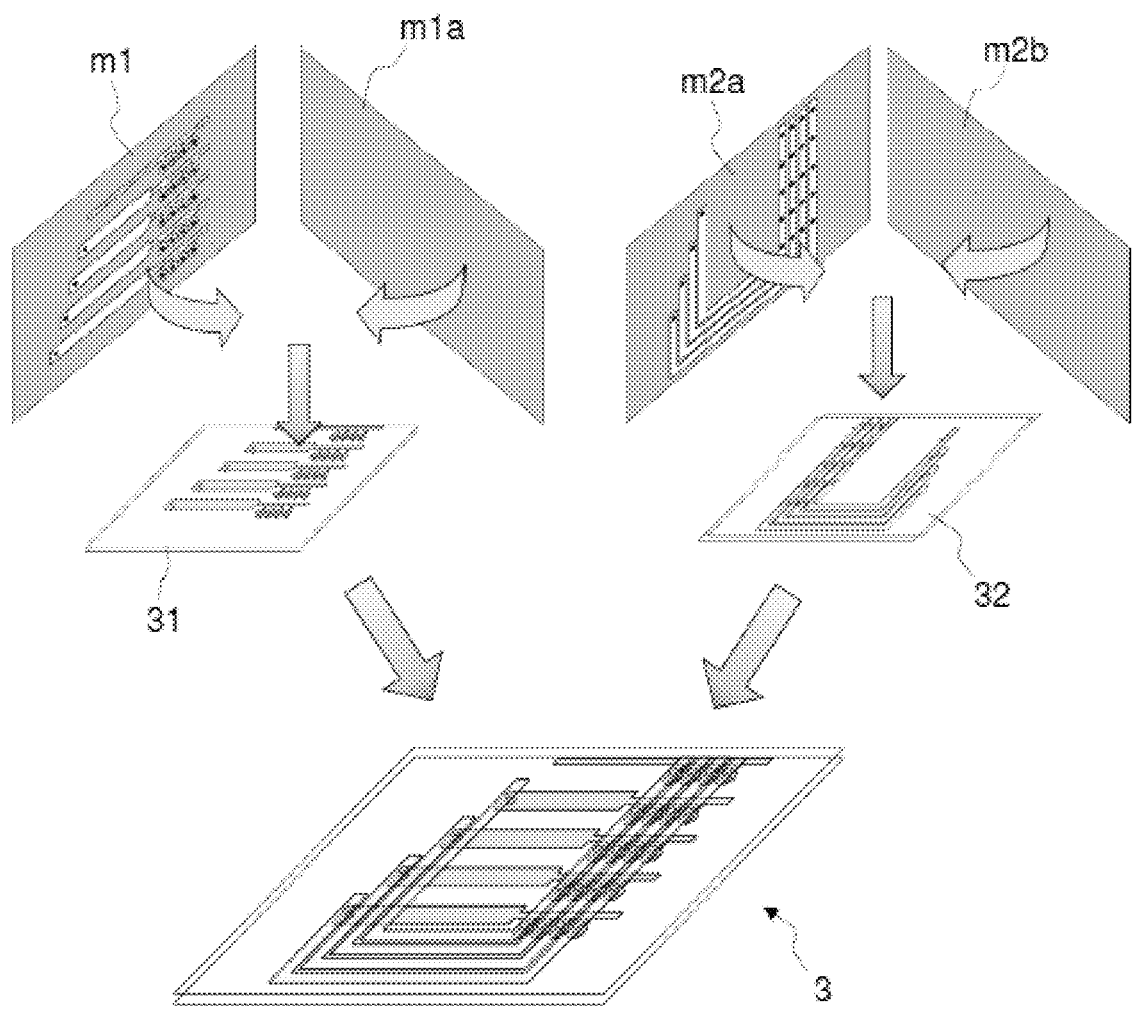

FIG. 1 assumes microfluidic structures etched in silicon chips. In other possible designs of the devices, polymeric chips may be fabricated using injection molding techniques, as illustrated in FIGS. 5 and 6. In other variants, wicking media may be used as a basis to form the various flow paths needed, as assumed in FIGS. 7A-D.

FIGS. 1 and 4 depict a 3D microfluidic chip fabricated in silicon, and including four microfluidic modules (i.e., empty chambers in that case, though black food dyes have been deposited, for visibility purposes in FIG. 4). Channels are patterned on each side of the core silicon chip, which include: an input channel 110, the modules 141-144 and four output channels 111-114 on one side; and four distribution channels 131-134 on the other side. Through vias 124, 131V-134V ensure fluidic communication from one side to the other. Twenty routing nodes are intercalated to provide complete control over the flow paths. The flow path surfaces can for instance be silanized (trichloro(octyl)silane), to achieve wetting surfaces. The microchannel depths is about 20 μm. The microfluidic structures are covered by PDMS covers on both sides of the chip. Such a device typically allow fluid flow rates of 1.5 μm/min.

In the examples of FIGS. 5-7, the microfluidic devices k (k=2, 3, 4) include two, three or more layers k1-k3, which layers embody two or more levels of the devices, as described earlier. That is, the multiple levels of the device are ensured by multiple layers. We note, however, that the number of levels involved in the device (typically three) may differ from the actual number of material layers used, which may be greater or smaller, depending on the fabrication method actually used.

In detail, each of the devices shown in FIGS. 5-7 has nodes that have an identical structure. In FIGS. 6 and 7, the input channel k10, the output microchannels k1l, the cavity k23 and the inlet port k21 of the nodes are all formed in a first layer k1, whereas the distribution microchannels k31 are formed in a second layer k2. An additional, intermediate layer is needed in the designs of FIGS. 7A-7D. Yet, a microfluidic chip may be formed in a single injection molding step, as in FIG. 5. Thus, the present devices may effectively involve one, two, three (or even more) layers of materials, let alone possible cover/capping layers. In comparison, the device of FIG. 1 essentially involves one silicon layer, appropriately structured and then capped on each side.

Two mold components m1, m2 are relied on in FIG. 5, which are suitably structured, whereby a single injection molding step suffices to obtain a direct fabrication of the polymeric chip 2. That is, two mold inserts m1, m2 are used simultaneously for molding. One m1 of the mold inserts has two depth levels, i.e., one to fabricate the microchannels and the other one to fabricate the vias.

In FIG. 6, two layer components 31, 32 are composite, polymeric layers, obtained thanks to two mold inserts m1, m2a. The modl insert m1 of FIG. 6 is basically the same as the insert m1 of FIG. 5, whereas m2a is the mirror symmetric of m2. Two injection molding steps are involved in that case. That is, the bottom layer 32 and top layer 31 are fabricated separately, by injecting material between each pair of mold components m1, m1a and m2a, m2b. The composite layers 31 and 32 are subsequently bonded. That is, on the one hand, the top layer and the vias and, on the other hand, the bottom layer, are fabricated independently using single mold inserts in two independent molding steps.

In the variants of FIGS. 7-8, a wicking medium (like a fibrous/porous medium such as paper or a nitro-cellulosic material) is used as a basis to form the flow paths. The boundaries of the flow paths may for instance be formed by a hydrophobic material, such as wax (i.e., the flow paths are wax-printed). Namely, the input and output channels, the node cavities and inlet ports are defined on an upper layer 41, whereas distribution channels are defined on the lower layer 42.

Here, the vias 424 of the nodes 420 are formed in an intermediate layer 43A, 43B, placed between the first layer 41 and the second layer 42. The intermediate layer 43A, 43B may be provided as a thin polymeric film, separating the first and second layers 41, 42. Apertures may be opened in this film, at locations corresponding to the cavities 423, to define vias 424 and hence enable fluidic communication. Two different approaches can be contemplated, as respectively explored in FIGS. 7A and 7B, whereby the nodes 420 may be normally OFF (FIG. 7A, wherein the thin-film 43A mostly seals each cavity 423 from below) or normally ON (FIG. 7B, wherein the thin-film 43B is here punched to open each cavity 423).

Even though wicking media 41, 42 are used in the examples of FIGS. 7-8, as opposed to silicon in FIG. 1 or polymeric materials in FIGS. 5-6, a comparison of FIGS. 1, 5-6 and 7A-B shows that similar patterns of microchannels and nodes may nevertheless be achieved for the devices 1-4b. For example, in FIGS. 7-8, each cavity 423 is provided on a top level of the device (embodied by layer 41). Also, the cavities are formed as through holes in the top layer 41 (so as to be notably open on top). An inlet port 421 makes the junction between an inlet microchannel 410-414 and a respective cavity, on the first layer 41 (see also FIGS. 7C, 7D). Outlet microchannels 431-434 are provided in a lower level, embodied by layer 42 in FIG. 7. A suitable polymeric thin film 43A, 43B is inserted between the two layers 41, 42. Punched holes 424, 431V-434V play the role of vias. The lower edges of vias 424 play the role of outlet ports 425 of the cavities, which enable fluidic communication toward the lower microchannels 431-434.

Figure 7A:
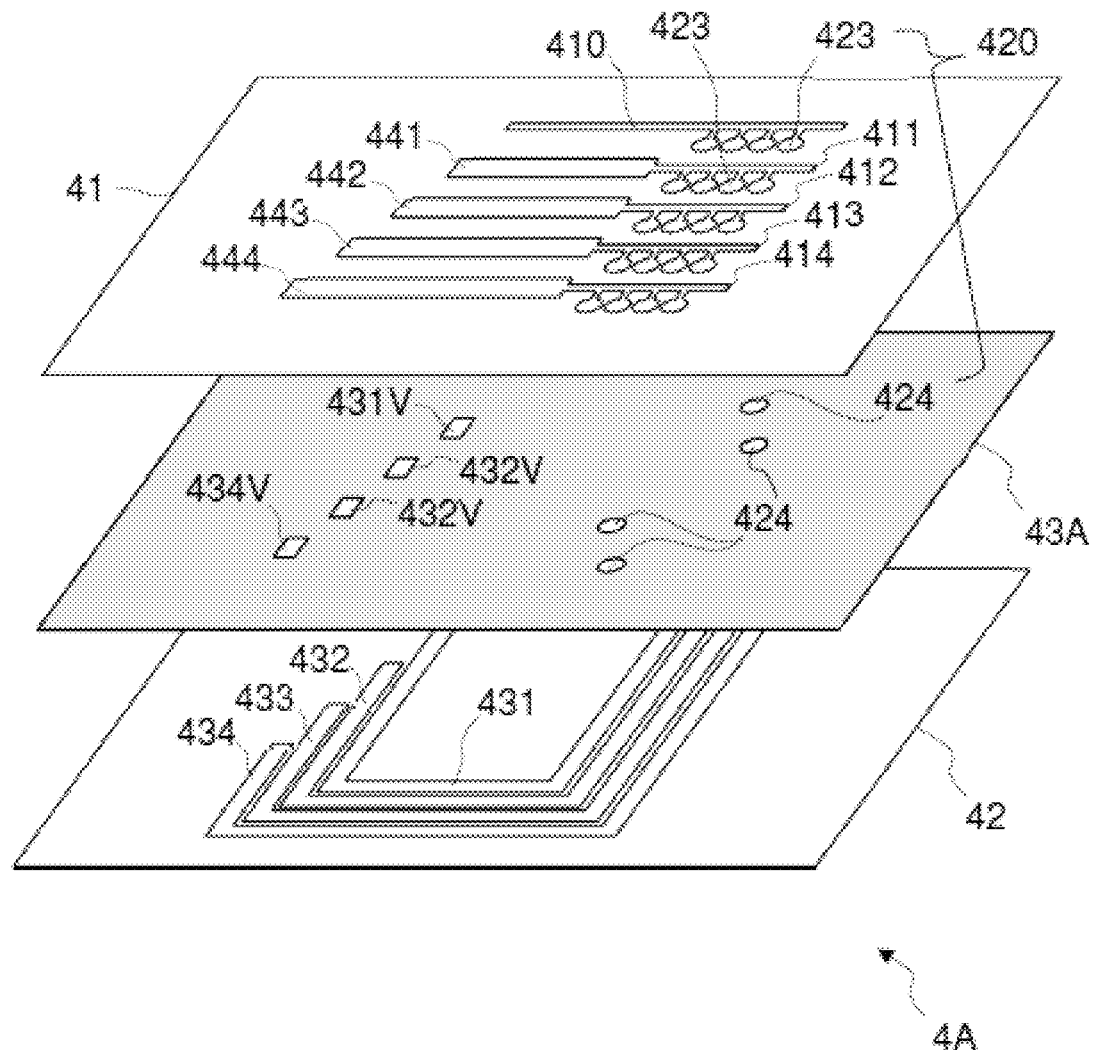
FIG. 7A-7D show exploded views of three-layer devices (or part thereof), whose flow paths can advantageously be implemented on wicking media (e.g., paper), as involved in other embodiments.

The inserted film 43A, 43B may solely be punched at selected locations, in order to activate corresponding nodes (as in FIG. 7A). That is, the device is normally OFF and selected nodes are activated in that case. In FIG. 7A, non-removed portions of the film 43A play the role of liquid blocking elements (see FIG. 8), which block liquid at the corresponding nodes.

Figure 7B:
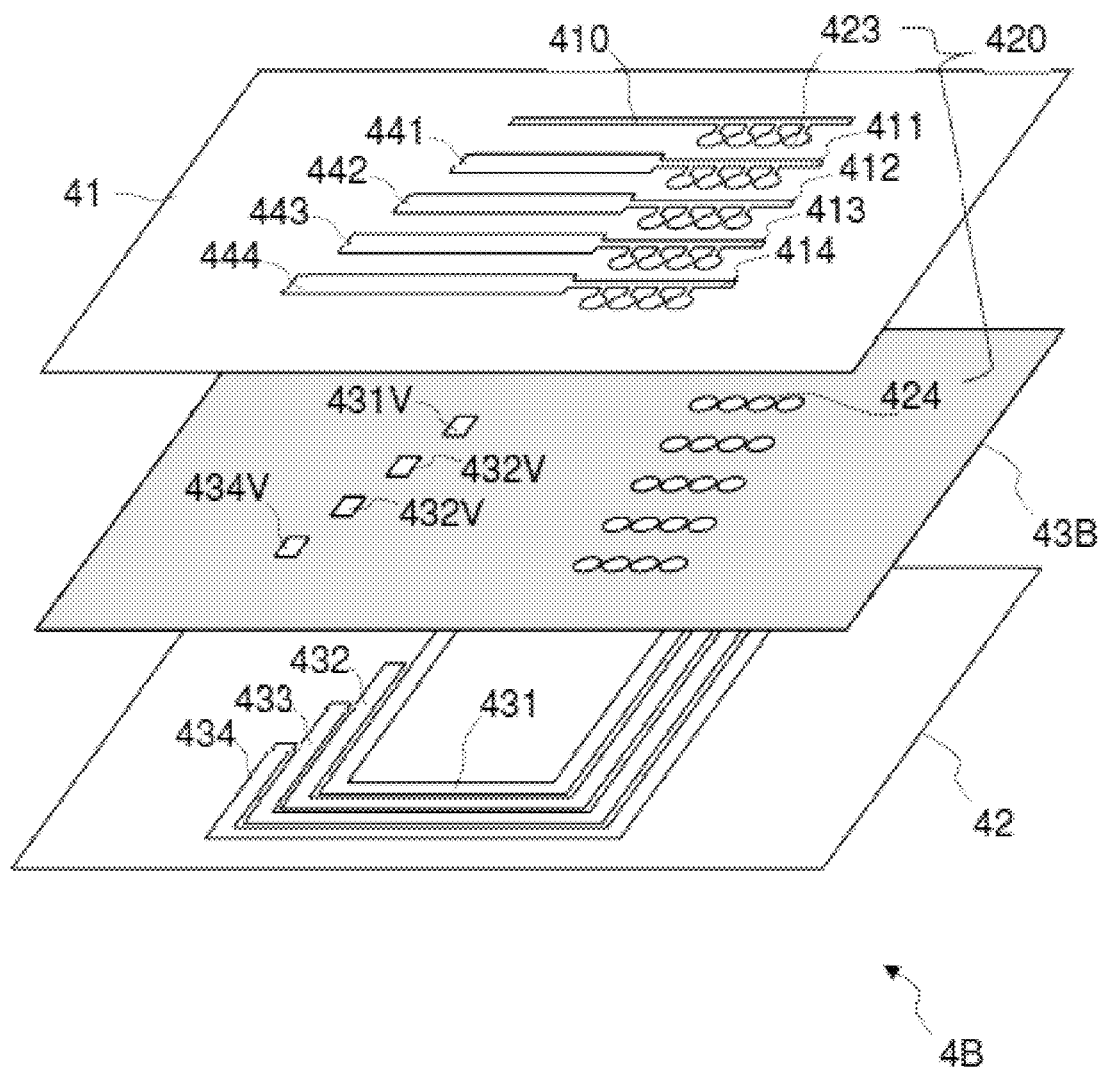
Figure 7C:
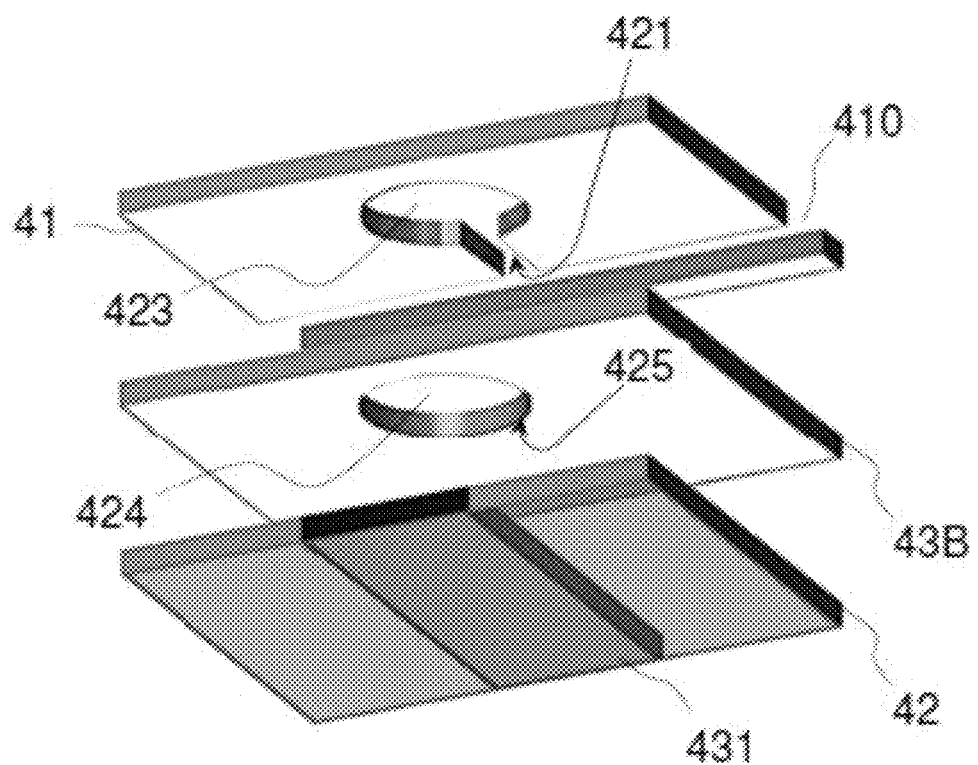
Figure 7D:
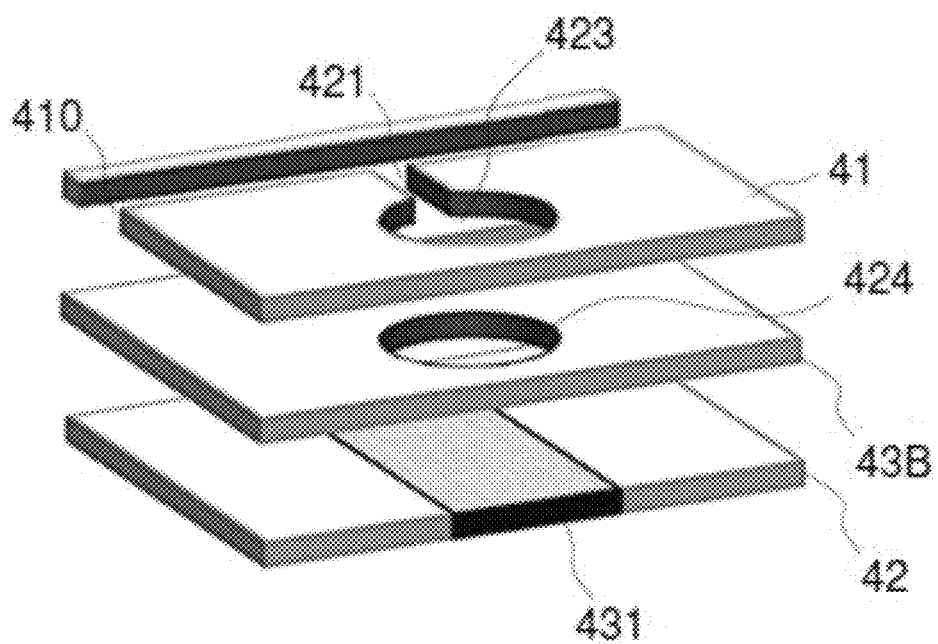

Conversely, in FIG. 7B, the film 43B is punched at all node locations, to allow for the device to be normally ON. This means that a subset of the nodes need be de-activated in that case. To that aim, a liquid blocking element 422 can be added in the cavities. This element 422 may for instance be formed by an alterable hydrophobic barrier 422, placed in the cavity or as a film sealing the latter from below. The hydrophobic barrier may for example be a removable substance (e.g., wax), inserted in the cavity.

Now, all cavities may systematically be filled with such hydrophobic barriers 422, thanks to an automated process, during a fabrication stage. This way, the device can be made normally OFF. Later on, an operator willing to customize the microfluidic template device may thus simply have remove selected ones of the hydrophobic barriers, such that only those nodes that effectively need be ON need be altered by the user. In general, one may seek to use liquid blocking elements 422 that are easily removable, such as wax, which can easily be melted or simply diluted in an appropriate chemical solvent, and then aspirated.

FIG. 8 shows a top view of a device according to FIG. 7B. FIG. 8 may also be regarded as resulting from the design of FIG. 7A, wherein the black disks corresponds to portions of the intermediate film 43A which have not been removed. Depending on the application targeted, the materials used, and the needed ratio of activated nodes to non-activated (or de-activated) nodes, one of the two approaches illustrated in FIGS. 7A and 7B may be more appropriate than the other.

Both the approaches of FIGS. 7A and 7B makes it possible to reconfigure the nodes as wax patches can be inserted and removed at will. Additional holes may easily be punched in the device of FIG. 7A and some of the holes may be sealed, e.g., using wax, if needed. Spotted chemicals 129 may also be removed and repositioned in a device as in FIG. 1 or 4. Yet, reconfiguring a chip as in FIG. 4 is more difficult, in principle, than reconfiguring a device as shown in FIGS. 7A and 7B.

In terms of dimensions, devices depicted in FIGS. 1, 4-6 are preferably dimensioned as follows. Each of the input microchannels, the distribution microchannels and the output microchannels has a depth that is between 10 and 100 μm (the depth is measured along axis z in FIG. 1). The depths of all channels (including inlet ports) may be, for instance, about 20 μm. In addition, the input microchannel, the distribution microchannels and the inlet ports preferably have a similar depth.

The width of the channels (as measured along axis x or y in FIG. 1) is typically between 10-200 μm (and preferably between 10 and 25 μm). The channel widths do not, however, play a critical role in the fluidic connections. The inlet port has a width that is preferably between 5 and 50 μm. In addition, the via has an average diameter that is typically between 25 and 200 μm (and preferably 50 and 100 μm), as measured in a plane parallel to (x, y). Relatively large dimensions of the vias are imposed so as not to add any additional hydraulic resistance at the level of the vias and not impair the fluidic connection. This, incidentally, also eases the fabrication of the vias. The thickness of the intermediate layer(s), in which the vias are formed, need typically be larger than 1 nm and is preferably larger than 1 μm, for mechanical robustness.

Such dimensions typically apply to chips, i.e., devices whose core chips are fabricated in silicon or injection molded. Devices relying on wicking media (FIGS. 7-8) would typically differ, in dimensions. For example, wax-printed devices are preferably dimensioned as follows. The minimal (in-plane) width of wax-printed, lateral channel walls may be on the order of 300 μm (as after printing), and 850 μm (after heat treatment, due to the wax spreading). The depth is determined by the thickness of the wicking media (typically larger than 100 μm). The channel width (i.e., the in-plane separation between the wax-printed, lateral walls) may for example be between 100 μm and 1 000 μm, with a typical 50 μm standard deviation, after heat treatment. The modules' chambers may be wider, if necessary.

In embodiments, the microfluidic devices can be implemented as test devices, i.e., devices generally configured for diagnostic testing. That is, at least one of the of the microfluidic modules has a flow path including reagents for enabling said diagnostic testing. Diagnostic testing relates to medical diagnostics and, more generally, to the determining or the analysis of the cause or nature of a medical problem or situation. Such test devices may notably be a portable, e.g., handheld device, such as for example a blood glucose meter, a dipstick or a test kit for detecting one or several analytes (e.g., homocysteine, C-reactive protein, glycated hemoglobin or HBA1C, HIV salivary assay, test for cardiac markers, tests for detecting allergens or genetically modified organisms, for the detection of pesticides and pollutants, etc.), or a pregnancy test. More generally, it may be any type of rapid diagnostic test (RDT) devices, i.e., devices used for quick and easy medical diagnostic tests. RDT devices typically allow results to be obtained within a few hours or less. They notably include point-of-care (POC) test devices and over-the-counter (OTC) tests. Furthermore, a test device as understood herein may be used to perform analyses going beyond medical diagnostic, for example for detecting toxins in water, etc. There are potentially numerous applications for such test devices, as the skilled person may realize.

In all cases, a sequence of two or more modules may be activated, which can in turn be optically detected for, e.g., subsequent decoding for validation or security purposes. Conversely, nodes of the above devices can be suitably programmed, to enable a desired liquid sequence. All this is described in the next section.

3. Preferred Embodiments of the Methods

3.1 Detection of Dynamic Patterns

In general, the present detection methods rely on optically reading a dynamic pattern, as caused by the liquid filling of the modules. As noted earlier, this pattern dynamically evolves as per the order in which the liquid passes through the microfluidic modules.

Thus, information can be associated with the order in which the modules are activated, as illustrated in FIGS. 17A-17F. These drawings depict the operation of a device 1 similar to that of FIG. 1 (distribution channels are not shown, like in FIG. 9), at different times. In such embodiments, the dynamic pattern is optically read by detecting a change of optical contrast 60A-60F of the microfluidic modules 14$l$ ($l$=1, . . . , 4). The successive changes in contrast are caused by liquid that passes through the microfluidic modules 14$l$, according to a sequence determined by the different pinning strengths of the nodes.

Figure 17A:
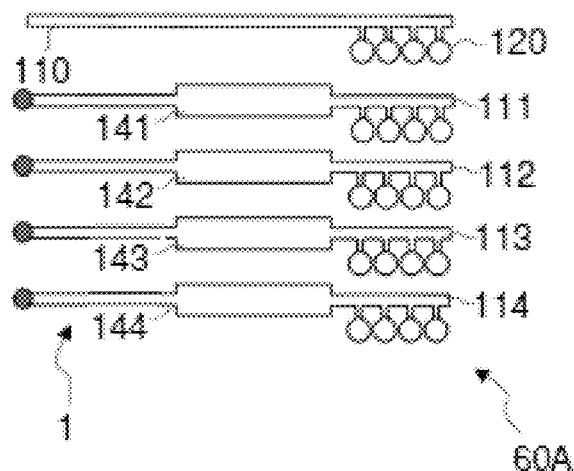
FIG. 17A-17F illustrates a simpler variant to FIG. 14, according to which a dynamic pattern is optically read by detecting a change of optical contrast in microfluidic modules of a device that is similar to that of FIG. 1, as caused by liquid passing through a programmed sequence of the modules.
Figure 17B:
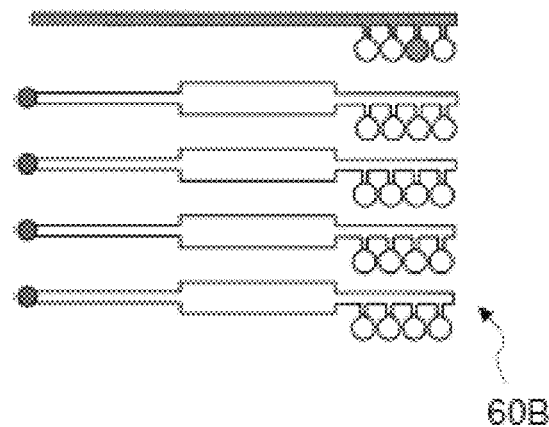
Figure 17C:
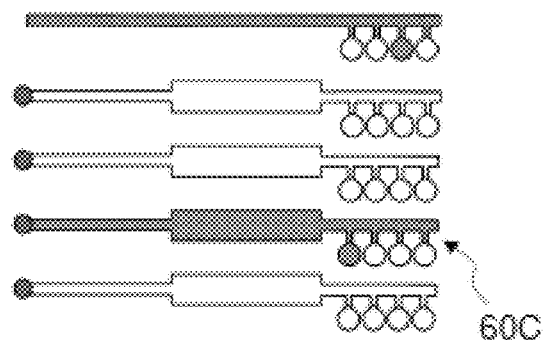
Figure 17D:
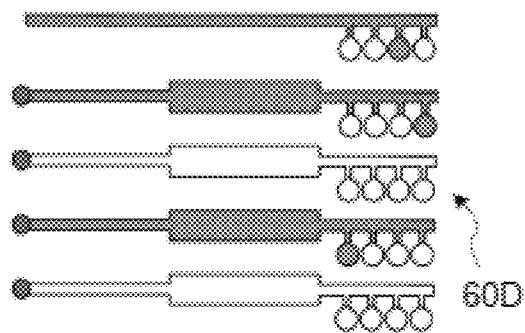
Figure 17E:
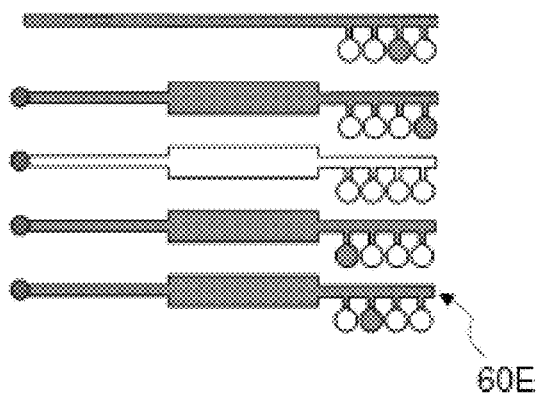
Figure 17F:
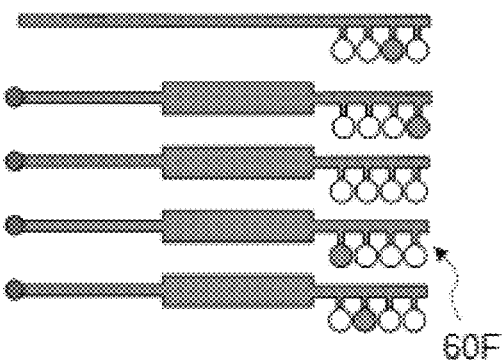

This sequence is the same as that of FIG. 4, as described earlier in sect. 2. Initially, no liquid is present (FIG. 17A). Then, liquid is introduced in the input channel 110 (FIG. 17B), at time $t_1$. As per activation of the third node of the first (upper) set of nodes, liquid then fills the third module (FIG. 17C), at time $t_2$, giving rise to a change in contrast that can be detected. As per activation of the first node of the third additional set (i.e., the fourth set from the top), liquid then fills the first module (FIG. 17D), at time $t_3$. This again gives rise to a change in contrast that can be detected. The process goes on with liquid filling the fourth module (FIG. 17E), at time $t_4$ and finally, the second and last module (FIG. 17F), at time $t_5$.

Note that the change in contrast may arise due to a change in color as caused by the liquid wetting the flow paths of the modules. If necessary, the flow paths formed in the modules may include some reagent arranged on the flow path surface (e.g., static spots), which are initially not visible. Yet, the reagent may be revealed thanks to a change of optical contrast caused by the liquid wetting the flow path of the modules.

In all cases, a sequence (corresponding to FIG. 17 to the $3^{rd}$, the $1^{st}$, the $4^{th}$ and the $2^{nd}$ modules) can be detected, e.g., using a handheld device, such as a smartphone or a tablet, equipped with a generic or dedicated application, that takes control of the camera embedded in the device. In variants, a USB camera, or a specialized or customized optical device may be used to that aim. In other variants, optical detection is performed thanks to an optical sensor such as a photodiode array mounted on a disposable chip, which may be distinct from the (local or remote) device used to decode the patterns reads.

In more sophisticated embodiments, the detection method may involve a device k having one or more microfluidic modules k4l that each include an optically readable medium. This medium forms a pattern of spots of material arranged on the flow path of the module. These patterns may be detected at given times corresponding to the activation times of the modules. Such embodiments are now discussed in reference to FIGS. 12-14.

Figure 12:
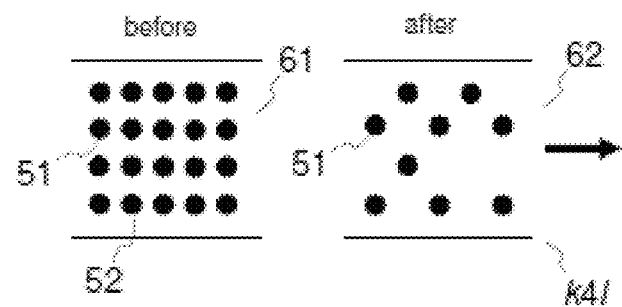
FIGS. 12-14 depict optical readable media that include a hidden pattern.

Referring to FIG. 12, at least one module k4l of the device k may include such an optical readable medium. The pattern 61 of spots of material may in fact include distinct subsets of spots made of different materials. That is, spots 51 and spots 52 are made of materials having substantially different solubilities in the liquid to be loaded in the input channel. In the example of FIG. 12, spots 51 have a lower solubility than spots 52, such that the spots 52 will be solubilized first, hence revealing a residual pattern 62. The spots 51, 52 preferably have a same color and contrast, initially, so as to make it possible to reveal a pattern 62 that is initially in the pattern 61, as seen in the screen shots of FIG. 13.

The residual pattern 62 formed by the first spots 51 may hence be optically read, after the spots 52 got solubilized or dissolved in and flushed by the liquid passing through the module k4l. The spots 51 may in fact not be visible, initially, such that the pattern that is initially visible may correspond to the complementary pattern (i.e., formed by pattern 61 minus pattern 62). Yet, the residual pattern 62 may eventually be revealed thanks to a change of optical contrast of spots 51, as caused by the liquid wetting them. Preferably yet, the two types of spots 51, 52 are visible but the contrasts and colors of the two types of spots can initially not be distinguished, upon visual inspection.

In other variants, only one type of spots is involved, which are initially not detectable upon visual inspection (to make it harder to fake). Yet, a change of optical contrast caused by the liquid can be detected.

Figure 14:
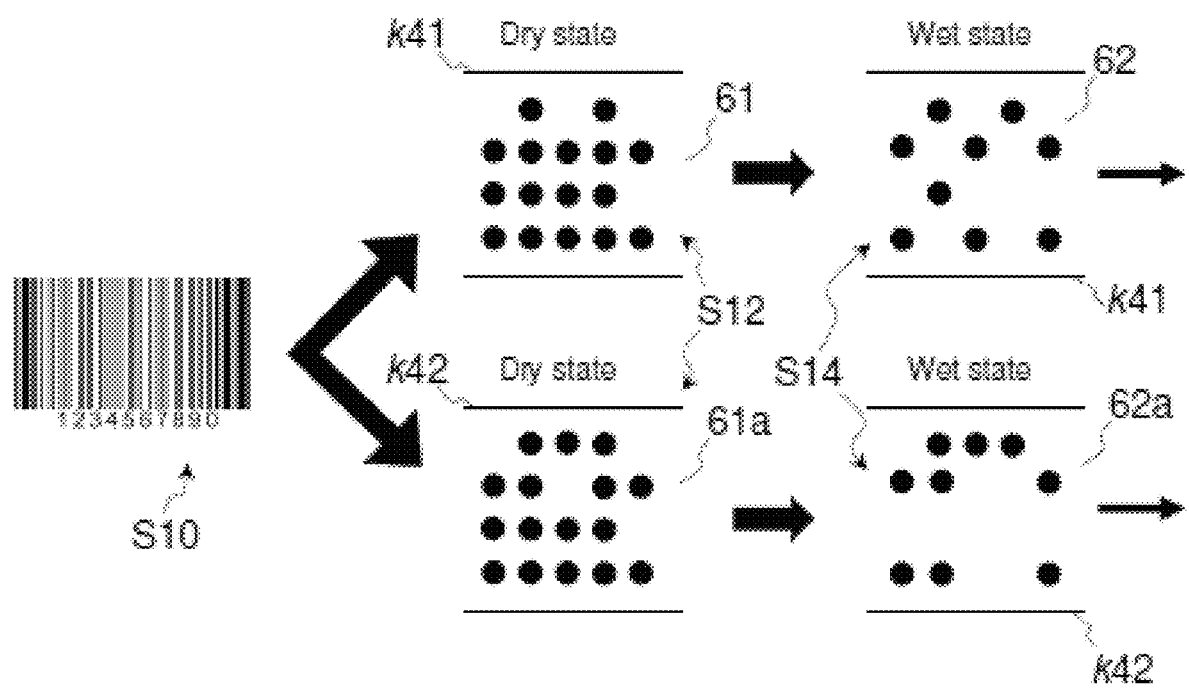
Figure 15:
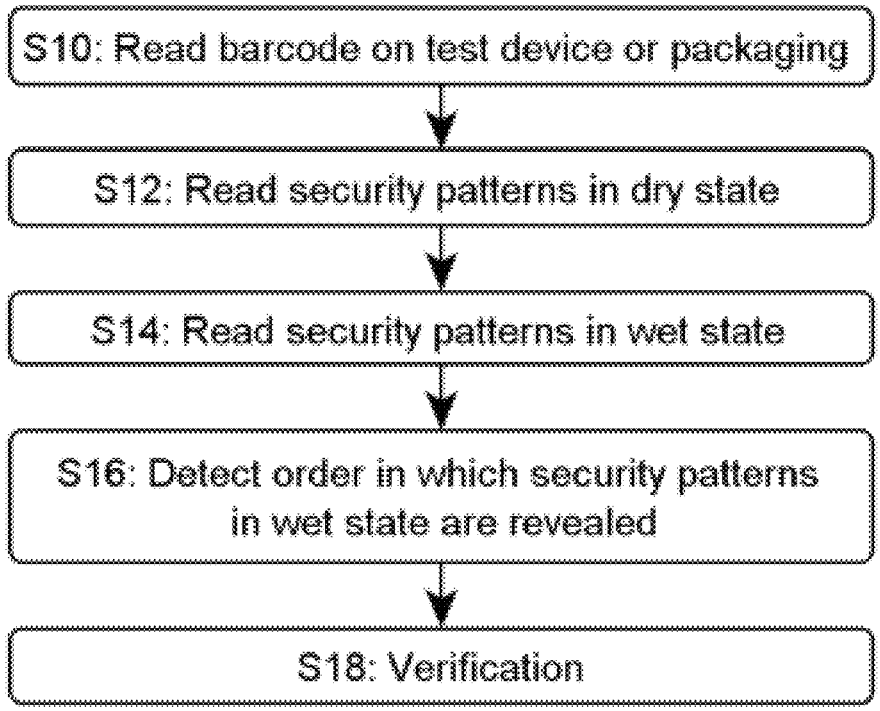
FIG. 15 is a flowchart illustrating high-level steps of a method for decoding information that is notably encoded in residual patterns of non-soluble spots, as in FIG. 14, according to embodiments.

Referring now to FIGS. 14, 15, optical readable media are preferably provided in two or more of the modules k4l of the device k. In that case, one may seek to optically read residual patterns 62, 62a as formed (at distinct times $t_j$) by residual spots 51 in each of the modules, after spots 52 got solubilized in and flushed by the liquid passing therein.

In fact, the initial patterns 61, 61a may too be optically read, if necessary, as assumed in FIGS. 14 and 15. That is, both the initial patterns 61, 61a and the final (residual) patterns 62, 62a may form machine-readable optical labels, which may be detected, in embodiments. The initial patterns may be detected at any time before the modules are activated, e.g., all at the same time, whereas the residual patterns 62, 62a will be read at distinct times, after they have been revealed.

All patterns meant to be optically read (starting with residual pattern 62, 62a) need be machine-readable and interpretable, in order to ascertain the occurrence of a corresponding event (i.e., a module being filled by liquid) and, possibly, to identify information encoded therein. In addition, such patterns 61-62a are preferably designed so as to ease optical detection, e.g., by a smartphone or a tablet.

In embodiments, patterns are detected together with their relative order of occurrence, without it being needed for the pattern to encode any particular information. Preferably yet, the pattern will encode additional information. The optically readable labels may, for instance, be a one- or two-dimensional barcode that encodes information as to, e.g., the device ID, the type of device, a given class of functionalization of the device, a module ID and/or a public or private key (for authentication purposes), etc.

Several methods are known which allow a digital image to be interpreted from a picture taken. Such techniques have for instance been massively developed, notably for mobile applications, e.g., for interpreting 2D barcodes or more generally for image recognition. For instance, the underlying algorithms may, if necessary, involve optical character recognition (OCR).

For instance, the residual patterns 62, 62a of the optical readable media of the microfluidic modules may encode respective keys 62, 62a, which altogether form a set of different keys, which may be complemented by keys encoded in initial patterns 61, 61a, if needed. Such keys are meant to be optically read and subsequently interpreted, in conjunction with the order in which they appeared. To that aim, the device used for detection may need to store optically read information as to said keys 62, 62a, as well as order information as to the order in which they were optically read. The order information may simply be a timestamp, associated to a picture, a digitized shape or any geometrical translation of the shape read. For example, time-stamped screenshots (i.e., a movie) may be acquired and stored, e.g., on a persistent memory of the detector or on a non-persistent memory. Patterns read may for instance be stored on a non-persistent memory of the device if the acquired information is to be processed or transmitted on-the-fly, e.g., passed to a server for further processing (decoding and verification).

Figure 13:
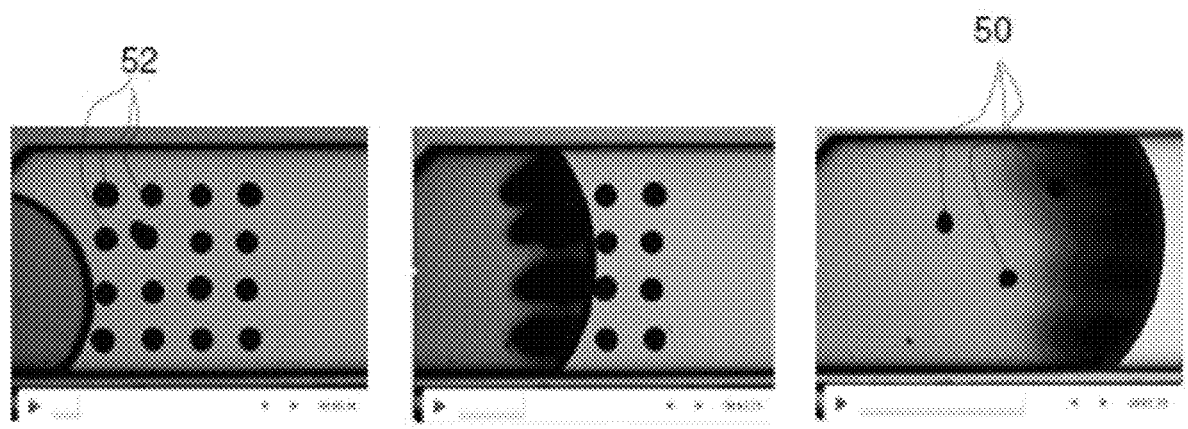

Preferably, the spots 51, 52 of each optical readable medium are arranged according to a bi-dimensional lattice, as assumed in FIGS. 12-14 wherein each cell of the lattice includes one or more spots of material 51, 52. Ideally, a cell includes one spot (at most), i.e., a spot of the first material or the second material. The first and second spots 51, 52 may for instance form complementary patterns, as in assumed FIGS. 12-14. In that respect, we note that the initial pattern need not be symmetric and may, on the contrary, form an incomplete pattern, so as to encode information, if needed.

Now, each cell of the lattice may in fact include several spots of material, to increase the contrast or, more generally, the detectability of the patterns. The lattice may for instance include q×r cells, where one or each of q and r is, in general, larger than or equal to 4, for example equal to 16. In all cases, having spots arranged according to a bi-dimensional lattice eases the pattern recognition. The pitch between contiguous cells of the lattice is preferably larger than or equal to 110 μm, which, in practice, results in very few or even no errors, when spotting droplets in the pixel template, as present Inventors observed. This point is discussed in detail in the next section. Additional technical considerations as to possible lattices, their structures and their fabrication are discussed in the next section.

Not all of the module may need be provided with an optical readable medium. Some of the modules may for instance be specifically be designed for a certain function (e.g., flow mixing, reaction), which may be incompatible with the presence of soluble spots. Also, soluble spots may contaminate subsequently branched modules. Indeed, soluble spots may interfere with the function of a given module or the modules subsequently connected. This may especially be of concern for microfluidic devices configured as test devices for diagnostic testing. In that case, one or more of the microfluidic modules k4l may have a flow path including reagents for enabling said diagnostic testing, i.e., whose reagents are meant to react with the loaded liquid. In such situations, the spots 51, 52 should be located downstream the reagents, so as to not interfere with the test.

Where several modules are connected which all include reagents, the modules dedicated to the test should hence be activated first, i.e., before modules including optical readable media (with soluble spots). This way, the loaded liquid first passes through each module that includes reagents, before passing through remaining modules of the device, as per an order determined by the nodes k20. We note, however, that an optical readable medium with soluble material may already be provided in the last module that has reagents, yet downstream of the reagents, so as to prevent interferences.

3.2 Forming Lattices of Spotted Materials

One or more of the following materials will typically be used to form the required flow paths: a polymer (e.g., a SU-8 polymer), silicon dioxide, glass, and wicking media (cellulose-based materials, such as paperboard, paper, etc.). Other materials may be contemplated, such as, e.g., a metal coating. However, a metal coating may require a more complex fabrication method (for instance a cleanroom or a complex process), or need toxic precursors.

As illustrated in FIGS. 11-14, the lattice is preferably a bi-dimensional lattice. The spots 51, 52 forming the patterns 61, 62 are preferably arranged according to a regular lattice, e.g., a square or rectangular lattice, whose overall dimensions fit well in the width of a module chamber. The spots are located at positions that correspond to a subset of cells of the lattice, so as to form a pattern 61, 62. The lattice is a systematic arrangement of cells, most practically in rows and columns. Each cell of a given lattice preferably has the same dimensions, in which case the steps a, b of the lattice, along directions x and y are constant. This eases the design, the fabrication and the deposition processes. Furthermore, the steps a and b are preferably equal, as assumed in FIGS. 11-14.

The cells may be filled by spotting one or more drops therein, to increase the size of the spot and the contrast, if needed. The fabrication process is nevertheless accelerated if only one drop can be spotted per cell, whence the advantage of optimizing the cell size vs. the drop size, as discussed below.

Yet, grids of varying cells may be contemplated, e.g., where some cells need be larger than others, because they will be used to encode more critical information and thus may need more optical contrast, or are less tolerant to errors in the spotting process. The lattice may thus have a non-constant step, in one or each direction x and y. Accordingly, "lattice" is to be interpreted broadly here, it may be any kind of grid, mesh, or tessellation, having constant steps, or not, and whose cells are addressable, so as to automate the deposition process.

In variants, a one-dimensional lattice may be used. The encoded information is, however, poorer and easier to fake in that case.

Figure 11:
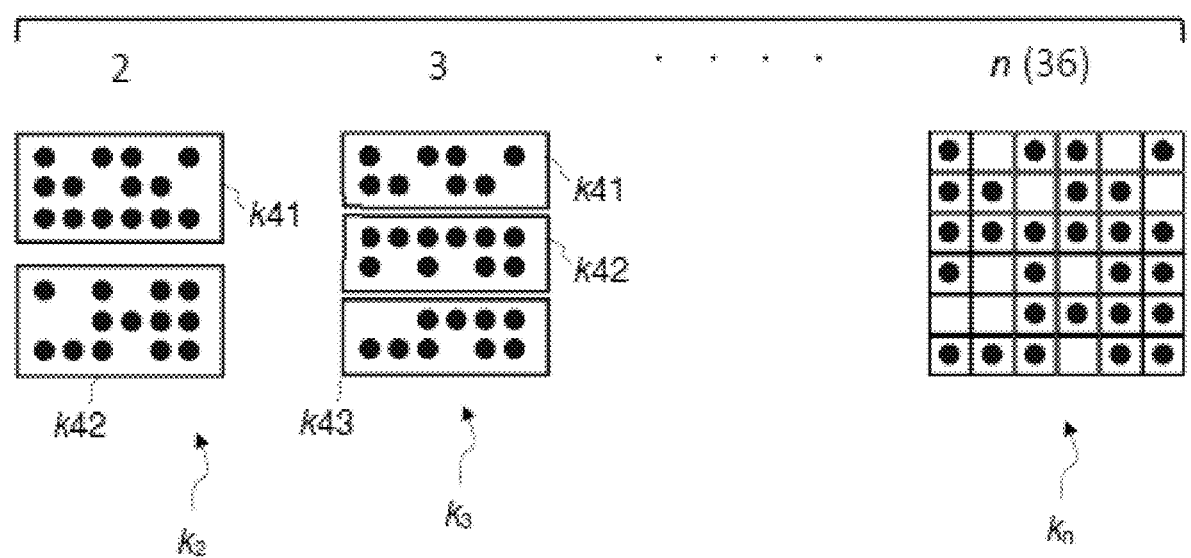
FIG. 11 schematically depict devices involving m modules (m=2, 3, . . . , 36) with optical readable media formed therein, the media including spots of materials arranged across the modules, as involved in embodiments.

The lattice and the resulting patterns 61, 62 may have an aspect ratio, as seen in FIG. 11 (for n=2 or 3), where the dimension of the lattice along x is substantially larger than along y. That is, the largest dimension is parallel to a longitudinal direction of extension of the flow path. This, in turn, allows to optimize the density of encodable information, which is especially advantageous where the flow path is provided in a microchannel or a chamber, owing to typical dimensions and form factor of the latter. In that respect, we note that a microfluidic module may restrict to a mere chamber or channel. Yet, the width of this chamber may be made larger than a typical width of a channel in the device, to accommodate reagents and/or optical readable media. If necessary more than one optical media (forming distinct patterns) may be provided in a same chamber, e. g., to secure detection.

The lattice per se need not be physically structured on the surface of the flow path of the module. This is especially true when a pattern of spots are spotted on cellulose or any other impregnable material. Thus, the patterns 61, 62 may be formed according to an abstract lattice and the spots deposited at positions corresponding to the center of cells of this abstract lattice.

However, when the flow path is formed on a surface such as a polymer, $SiO_2$, glass, etc., then the cells of the array may be physically structured on the surface, to ease the spotting. When spots 51, 52 are formed out of different materials, the first spots 51 may be located at positions corresponding to a subset of the cells (the hidden pattern 62, 62a), whereas additional spots 52 may be located at positions corresponding to complementary cells of the lattice, i.e., cells that are distinct from said subset of cells and constitute a second, distinct subset. The juxtaposition of the first and second subsets need not map the entire lattice of a particular optical label, contrary to the depictions of FIGS. 12 and 14, although it may do so, as in FIGS. 12-13. What is needed is to hide the pattern 62 within the initial pattern 61, such that a minimal number of one spot 52 in needed for each label. Most simple, however, is to design the first and second subsets as perfect complementary subsets, each time mapping the entire lattice of a particular optical label, as illustrated in FIG. 12.

In all cases, the pattern 62 (consisting of insoluble spots 51 only) appears only after the soluble spots 52 were flushed by the liquid as the latter advances in the flow path, as otherwise seen in the screen shots of FIG. 13.

In embodiments, the pitch between contiguous cells of the lattice is larger than or equal to 110 μm. Above this threshold, errors tend to substantially decreases, as further described below.

The lattice may typically includes q×r cells, where each of q and r is, in general, larger than or equal to 4. For example, a 5×4 lattice may be used, as in FIG. 12. Larger lattices are, however, preferred, such as 16×5 (not shown). Preferably, the lattice exhibits an aspect ratio, such that q (along x) is larger than r (along y), for reasons mentioned earlier. In general, a 16×r lattice may advantageously be used when inkjet spotting the patterns 61, 62. This makes it possible to efficiently exploit recent generations of inkjet spotters, which may include a line of up to 16 nozzles in one row.

Using a grid allows to indicate a user that a code, a key, or any indication was added to a device. Even simple codes may create a technical barrier sufficient to repel fraud. Another level of information may relate to a fabrication batch id. It is indeed typical for diagnostic tests from different batches to exhibit slightly different performances (e.g. sensitivity, error bars, etc.). Calibration tables for specific batches can be used for normalizing test results and the batch can be identified based on the optical codes. Codes can benefit from a relatively large number of cells (e.g., 16×m), as necessary, in particular if a unique ID is affixed to a single module. E.g., a 16×16 grids with 100×100 µm cells allows encoding ~100 bits/mm². Yet, 256 bits may be unnecessary, if only a few octets need be encoded. There is a trade-off between the information one wishes to encode (and so the desired level of security) and the affordable fabrication time per device. In variants where simple optical codes are needed, only one row of spots may suffice.

The lattice may, in embodiments, be physically imprinted on the devices. That is, structures may be formed on a surface of the modules, e.g., on the surface forming the flow path, according to the lattice. Said structures are accordingly located at positions corresponding to cells of the lattice. The spots 51, 52 are, in turn, arranged in or on such structures.

The structures can notably be embodied as cavities or wells, or islets, which are relatively simple to fabricate. More generally, other types of structures can be contemplated, e.g., that include slanted walls. The lattice preferably includes only structures of one type (e.g., cavities or islets), which preferably have all the same dimensions, to ease the design, the fabrication and the deposition processes.

Two contiguous structures are preferably separated by a gap. The gaps may most simply consists of raised portions (or walls), to delimit cavities, or of blind holes (or grooves), to delimit islets. Such gaps are preferably larger than 10 µm on average. The gaps are measured in-plane, along a relevant direction between two contiguous cells, i.e., the direction x or y. A minimal gap of 10 µm eases the optical reading and avoids fabrication issues, notably if there is a slight misalignment between the spotter and the ideal cells' positions. The gaps ensure distinctness between the spotted pixels and avoid errors in the deposited spots 51, 52. The capillary effects caused by the gaps (involving corners and the like) prevents liquid drops from wetting other cells and merging.

Preferably the gaps are larger than 25 or even 50 µm. Optimal dimensions generally depend on the inner dimensions of the structures, the nature of the liquid sample and the number of drops of the liquid spotted per cell, etc. In embodiments, the gap may reach 75 µm, it being noted that the maximal size of droplets is typically of about 70 µm. A gap larger than 25 or 50 µm ensures a good readability, even when using a low-cost optical detection system. Since a droplet has a size that typically is around 70 µm or less when being ejected by an inkjet nozzle, a larger gap (e.g., of 75 µm) makes sure that a drop does not bridge two adjacent islets.

Typically, spotting is performed using a surface-head distance of ~0.25 mm. A fraction of the droplet may evaporate before the droplet reaches the surface (e.g., up to 20%, depending on ambient relative humidity). Spotting from distances larger than 1 mm strongly increases the risk of evaporation of the droplet and may pose problems when droplets are ejected slightly obliquely from the head. To mitigate this problem, larger gaps (e.g., of 75 µm) can be contemplated. If a spotter needs to be placed further away from the surface due to the presence of topography on the surface, then even larger gaps (≥75 µm) can be contemplated but this will typically require a larger footprint for the patterns 61, 61a and may also affect the cost of the device. If, on the contrary, the head of an inkjet spotter comes too close to the surface of the device, the droplet will land to the surface with its maximum size, such that a 75 µm gap will suffice to avoid placement errors.

In embodiments, the average depth of the structures is larger than or equal to 5 µm. The average depth is measured perpendicularly to the average plane of the surface. A depth of 5 µm is sufficient, in practice, to provide satisfactory pinning of the spotted material. Larger depths can nevertheless be contemplated. Yet, the structures should preferably be designed to allow for the optical code to be as much as possible co-planar with the test signals. In this manner, both the test result and the optical code can be optically read using the same focal plane. The average depth of the structures shall therefore be smaller than 50 µm, in general.

The average in-plane dimension of the structures is preferably larger than or equal to 100 µm, and more preferably smaller than 500 µm. The average in-plane dimension of the structures is measured parallel to the average plane of the surface. The average in-plane dimensions of the structures correspond, e.g., to the average side of a rectangle or a square or to the diameter of a circle, depending on the shape chosen for the structures.

Reminding that gaps between the lattice structures are preferably larger than 10 µm, the step or pitch of the lattice will therefore typically be larger than 110 µm. Ensuring such a minimal step results in that very few or no errors subsist, when spotting liquid in the pixel template to form spots 51, 52, as the Inventors observed. This can tentatively be described by the fact that 50-70 µm drops can still easily be created and precisely spotted, whereas creating and spotting smaller drops is more difficult, owing to competition by the surface tension of the liquid.

A large variety of spotting materials, deposition surface and cell structures, of various dimensions have been tested. When using impregnable materials (without any cells structured thereon), nicely contrasted spots can be obtained. When using cells structured as islets, best results were obtained with 100 µm-wide islets separated by gaps (hollows) of 10 µm. Larger gaps are more visible and may possibly hinder the pattern recognition; they furthermore impact the density and thus the footprint of the optically readable medium. Yet, pattern recognition should still be possible, even with larger gaps, as long as the pattern fits in the field of view. When using cells structured as wells or cavities, best results were obtained with 100 µm-wide wells (cavities) separated by gaps of 10 to 25 µm. Small gaps (e.g., 10 µm) already yield satisfactory results. Larger gaps lead to good results too, but impact the density and thus the footprint. In general, the same cell's and gap's dimensions can be used for both the well and islet structures. All in all, wells are preferred over islets as they lead to better optical properties.

3.3 Methods for Decoding Information Encoded on Microfluidic Devices

According to another aspect, the invention can be embodied as a method for decoding information encoded in a microfluidic device k such as described herein, as now described with reference to FIG. 15.

Basically, such a method revolves around optically reading S12-S16 information encoded on the device k, according to steps already described in section 3.1. Essentially, a dynamic pattern is detected, which involves a certain order in which modules are activated. Information encoded in the dynamic pattern read is subsequently decoded S18, e.g., for verification purposes.

Steps S12-S16 may for instance be performed using a handheld device or a USB camera, or any specialized or customized optical device, as discussed in sect. 3.1. in addition to the residual patterns 62, 62a read S14, the initial patterns 61, 61a may be detected too S12, i.e., in a dry state, before the corresponding modules be activated. If necessary, further information as to the device may be acquired S10, e.g., prior to detecting optical readable media formed by the patterns 61-62a. E.g., a mere barcode on the packaging of the device may be read at step S10.

Next, information encoded in the various patterns read may, together with the order in which residual patterns occur, be decoded at step S18, using any suitable algorithm, implemented in-situ (e.g., directly at the handheld device or the detector), or remotely (the data read is sent to a server for verification).

Decoding S18 typically takes place after use of the device 1-6. Several patterns 61, 61a, 62, 62a may need be optically read and decoded. All patterns may then be involved in a subsequent verification process S18. If necessary, a barcode on the packaging of the test device is additionally read S10, to strengthen security, as assumed in FIGS. 14 and 15. That is, data read, on the one hand, at steps S10 and, on the other hand, at steps S12-S16, may be complementary in the sense that the data initially read (at step S10) may be necessary to interpret data subsequently detected (S12-S16) and validate the test.

In general, the dynamic pattern read may be used to complement the test, to check its validity (technically speaking) or its genuineness (security purposes), during the verification step S18. In embodiments, step S18 includes authenticating the microfluidic device k based on the decoded information. Authenticating here means ascertaining the authenticity of the device and should be interpreted in a broad sense. This authentication is based, at least, on the decoded information, although additional user and/or device credentials may be required at this step.

The authentication may further be based on additional information, e.g., an identifier of the device k, as provided therewith and scanned or read at step S10. This additional information may be provided by way of, e.g., an additional machine-readable optical label. It may for instance be provided on a surface of the device, a packaging, or a documentation thereof. This additional optical label may be notably be provided as a two-dimensional barcode on a sticker stuck on an external surface of the device. In variants, this additional optical label may be provided on a packaging of the device or on a related documentation. Providing this information directly on the device, however, mitigates the risk of non-intended or malicious use.

The verification step S18 preferably makes use of both the keys encoded in the patterns 61, 61a, 62, 62a read and order information as to the order in which the hidden keys were acquired. To pass the verification steps, the keys need be consistent with the order information. The verification may be processed according to a challenge-response algorithm, wherein, e.g., the set of keys read serve as a challenge, while the order in which they appeared serves as a response. The keys may for instance be obtained as mere hashes of the intended order, using distinct hash functions. In variants, the initial information read at step S10 serves as a challenge, to which the set of keys read together with the order in which they appeared serve as a response. Many variants can be contemplated.

3.4 Encoding Information in Microfluidic Devices

According to a final aspect, the invention can be embodied as a method for encoding information in a microfluidic device k such as described in section 2.

Basically, such methods consist of altering a subset of the nodes k20, to allow for the nodes k20 to have different liquid pinning strengths in each of the first set and the second set of nodes. Nodes are altered consistently with the order in which the modules are to be connected. In practice, a given connection scheme is assumed for a batch of devices to be fabricated, which scheme is provided as encoding information data fed as input to a tool, which subsequently alters (e.g., activates or de-activates) nodes accordingly.

Figure 16:
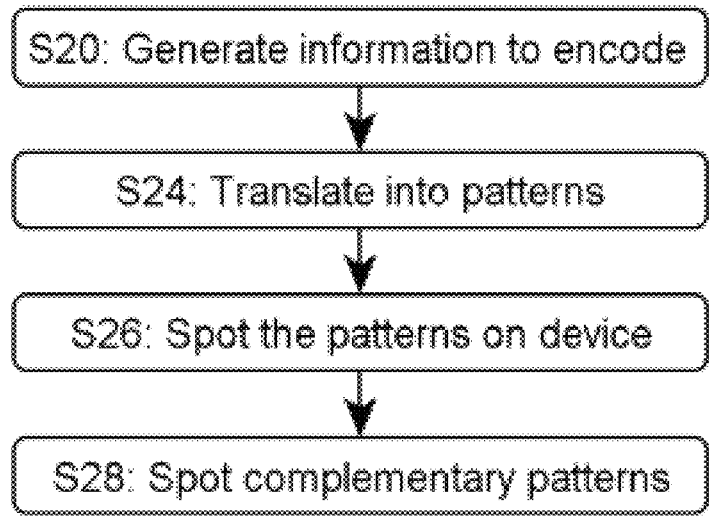
FIG. 16 shows another flowchart, which illustrates high-level steps of a method for encoding information by way of optical readable media, as in FIG. 14, according to embodiments.

In addition, where optical-readable labels are desired, additional information need be encoded as patterns 61, 61a, 62, 62a in one or more of the modules. This can be achieved thanks to method such as given in FIG. 16. Here, based on additional encoding information S20, patterns 61-62a are designed S24 and then directly formed on the devices, e.g., by spotting S26-S28 elements 51, 52 to form the patterns 61-62a. The information needed is generated S20 and translated S24 during a prior phase, thanks to techniques generally known in the art and according to methods that are orthogonal to the present invention.

Where elements 51, 52 have different chemical compositions (e.g., soluble and insoluble elements forming complementary patterns), these are typically deposited at distinct deposition steps S26, S28. Said elements can for instance be spotted using an inkjet spotter, or using pin-spotting or quill-spotting, as known per se.

3.5 Permuted Coding

A binary coding scheme with n-bits yields $$\sum_{k=0}^{n}\binom{n}{k}=2^n$$

number of individual codes, where k is the number of set bits. Now, if the code is divided into parts and each part is printed in a respective module, as in embodiments, then different parts of the code can independently be changed in an order that is determined by the states of the nodes. Such a scheme is referred to as "permuted coding" hereon. In a device with m modules and m×(m+1) nodes, there are m! possible flow paths that can be programmed if each module is to be used once, as mentioned earlier. Therefore, the number of individual codes that can be read from modules is $$\sum_{k=0}^{n}\binom{n}{k}m!=2^n m!.$$

The equivalent bit depth read by the reader is then $n+\log_2 m!$. Thus, permuted coding adds $\log_2 m!$ effective additional bits to simple binary coding. The code complexity is all the more increased where the number of bits per module is small. The code complexity approaches that of binary coding for large n and small m.

In addition, and as noted earlier, the array of nodes which determine the sequence of changing blocks can be kept hidden from the observer. The sequence is only revealed when the security feature is filled with a liquid, which property adds another level of security against counterfeiters.

Permuted coding requires deposition of extra spots for node activation, which could potentially increase the code writing time and the fabrication costs. The total coding time for a given batch when m=1 (binary coding) is $$\sum_{k=0}^{n} ak\binom{n}{k} = an2^{n-1},$$

where k is the number of set bits and α is the time required to spot one bit. Then, a single chip is coded within a mean time of $$\frac{an2^{n-1}}{2^n} = \frac{an}{2}.$$

For permuted coding, m extra spots are deposited. Then, the total time to code a batch becomes $$\sum_{k=0}^{n} a(k+m)\binom{n}{k} = m!$$

and the mean time is $$\frac{a}{2^n m!} \sum_{k=0}^{n} (k+m)\binom{n}{k} m! = \frac{a(n+2m)}{2}.$$

As present inventors observed, the writing of the permuted coding becomes faster than binary coding for m≥9. For m≤8, the effect of additional write time becomes negligible above 64 bits of read code. Thus, bit writing parameters can be suitably chosen, such that permuted coding does not bring any additional time cost or the additional time cost is negligible.

Yet, the implementation of permuted coding requires significantly more space than binary coding. For binary coding, the required area scales linearly with the number of bits, such that the code area needed is $$\frac{n}{d},$$

where n is number of bits, and d is the bit density.

Permuted coding incorporates additional nodes and microfluidic channels, for which the feature density is considerably lower than the bit density. Then, the total area required is $$\frac{n}{d} + \frac{m^2+m}{v},$$

where v is the feature density.

A parameter that can advantageously be considered for implementing ordered codes is the free chip area. Once the available space is determined, the code complexity is maximized by increasing the number of modules and bits per module, where a module contains a part of the code.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated. For example, various material could be used for the microfluidic chips, such as polydimethylsiloxane (PDMS), glass or metal wafers. As another example, other types of valves, including passive or active microvalves may be contemplated, as known in the art.

What is claimed is:

1. A method for optically reading information encoded in a microfluidic device, the method comprising:
   providing the microfluidic device, comprising:
      an input microchannel;
      microfluidic modules; and
      sets of nodes, wherein:
         each node of a first set connects an input microchannel to one of the microfluidic modules;
         each node of a second set connects the one of the microfluidic modules to another to form an ordered pair of the microfluidic modules; and
         the nodes of the first and second sets have different liquid pinning strengths;
   loading liquid into the input microchannel of the microfluidic device to cause an ordered passage of the liquid through each of the microfluidic modules in an order determined by the liquid pinning strengths of each of the nodes, such that the passage produces an optically readable dynamic pattern which evolves in accordance with the development of the passage through the device; and
   optically reading the dynamic pattern.

2. The method of claim 1, wherein optically reading the dynamic pattern comprises:
   detecting a change of optical contrast of the microfluidic modules, wherein the change is produced by the passage of the liquid through each of the microfluidic modules.

3. The method of claim 2, wherein one or more of the ordered pair of the microfluidic modules comprise:
   an optically readable medium comprising a pattern of spots of material arranged on a flow path thereof, wherein the pattern of spots are not visually detectable, and wherein the change of contrast of the microfluidic modules is produced by wetting of the pattern of spots by the passage of the liquid.

4. The method of claim 1, wherein one or more of the ordered pair of the microfluidic modules comprise:
an optically readable medium comprising a pattern of spots of material arranged on a flow path thereof, the spots comprising first spots of a first material and second spots of a second material, wherein the first material is less soluble in the loaded liquid than is the second material, and wherein a residual pattern is formed by the first spots and the second spots, such that the residual pattern produces the dynamically changing pattern as the second spots are dissolved and flushed by the passage of the liquid.

5. The method of claim 4, wherein each of the microfluidic modules of the device comprise the optically readable medium comprising the patterns of spots.

6. The method of claim 5, wherein the optically readable medium comprises an initial residual pattern formed by the first spots and the second spots before the second spots are dissolved and flushed by the passage of the liquid to produce the dynamic pattern.

7. The method of claim 5, wherein the optically readable media of the microfluidic modules comprise respectively encoded keys forming a set of keys, and wherein the method further comprises:
storing optically read information from the respectively encoded keys; and
storing information relating to an order in which the optically read information was read.

8. The method of claim 5, wherein the patterns of spots are arranged in the form of a bi-dimensional lattice.

9. The method of claim 8, wherein a pitch defined by cells of the patterns of spots of the lattice is greater than or equal to 110 μm.

10. The method according to claim 8, wherein the bi-dimensional lattice comprises q×r cells, and wherein each of q and r is greater than or equal to 4.

11. The method of claim 1, wherein each of the nodes of the first and second sets is concealed within the device to prevent visibility thereof by a user.

12. The method of claim 1, wherein the loaded liquid is either pinned or passed by a node of the nodes of the first and second sets, in accordance with the liquid pinning strength of the node.

13. The method of claim 1, wherein the microfluidic device comprises:
a set of m distribution microchannels, wherein m≥2;
a set of m output microchannels; and
a set of m microfluidic modules; wherein:
each of the m distribution microchannels are in respective fluidic communication with each of the m microfluidic modules; and
each of the m output microchannels are in respective fluidic communication with an output of each of the m microfluidic modules, wherein:
the first set of nodes comprises m nodes, each of them nodes branching from the input microchannel to a respective one of the distribution microchannels to establish fluidic communication therebetween;
the second set of nodes comprises m subsets of m nodes each; wherein:
each of the m output microchannels branches into each of the m nodes of a respective one of them subsets of m nodes; and
the nodes in each of the first set and in each of the m subsets of the second set have different liquid pinning strengths, such that the ordered passage of the liquid through each of the m microfluidic modules is determined according to the different liquid pinning strengths of the nodes in the first set of nodes, and in the m subsets of nodes.

14. The method of claim 13, wherein the microfluidic device is a diagnostic testing device, and wherein one of the m microfluidic modules has a flow path comprising reagents for use in diagnostic testing.

15. The method of claim 14, wherein the loaded liquid passes first through the one of the m microfluidic modules having the flow path comprising the reagents before passing through other of the m microfluidic modules in accordance with the different liquid pinning strengths of the nodes of each of the first and second sets of nodes.

16. The method of claim 13, wherein the first and second sets of nodes, taken together, form m+1 sets of m nodes, wherein the nodes are arranged in the form of an array having a crossbar switch configuration and the array comprises m×(m+1) nodes.

17. The method of claim 16, wherein the microfluidic device comprises distinct parallel levels including a first level and a second level, and wherein the input microchannel and the output microchannels are defined on the first level, and the distribution microchannels are defined on the second level.

18. The method of claim 17, wherein each node of a subset of the m+1 sets of m nodes comprise:
a cavity formed on the first level, the cavity comprising an opening on a top side thereof;
an inlet port formed on the first level, the inlet port branching from the input microchannel or one of the output microchannels, and in fluidic communication with the cavity through an ingress thereof;
an outlet port branching to one of the distribution microchannels on the second level; and
a via extending from the cavity to the outlet port to enable fluidic communication therebetween, wherein:
the cavity comprises a liquid blocking element to prevent an aqueous liquid that fills the inlet port from reaching the outlet port of the node.

19. The method of claim 18, wherein the via extends across a third level of the device from a bottom side of the cavity down to the outlet port, wherein the bottom side is positioned opposite a top side of the cavity, and wherein the third level is positioned between the first level and the second level.

20. The method of claim 1, further comprising:
obtaining encoded information from the optically read dynamic pattern; and
decoding the information.

21. The method of claim 20, further comprising:
authenticating the microfluidic device based on the decoded information.

22. The method of claim 21, wherein authenticating the microfluidic device is further based on an identifier of the device.

23. The method of claim 20, wherein the optically readable media of the microfluidic modules of the device comprise respectively encoded keys forming a set of keys, and wherein the method comprises:
obtaining information encoded in the keys by optically reading the dynamic pattern;
storing the encoded information, as well as information relating to an order in which the encoded information in the keys was optically read; and decoding the obtained information by interpreting the encoded information in conjunction with the order in which the encoded information in the keys was optically read.

* * * * *